United States Patent
Wu et al.

(10) Patent No.: US 12,149,709 B2
(45) Date of Patent: Nov. 19, 2024

(54) MEDIA CONTENT BOUNDARY-AWARE ENCODING

(71) Applicant: Amazon Technologies, Inc., Seattle, WA (US)

(72) Inventors: Yongjun Wu, Bellevue, WA (US); Sitaraman Ganapathy, Issaquah, WA (US); Abhishek Kumar, Bothell, WA (US); Vasanthakumar Soundararajan, Seattle, WA (US); Kyle Alexander Woo, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 17/854,505

(22) Filed: Jun. 30, 2022

(65) Prior Publication Data

US 2024/0007651 A1   Jan. 4, 2024

(51) Int. Cl.
*H04N 19/167* (2014.01)
*H04N 19/172* (2014.01)

(52) U.S. Cl.
CPC ......... *H04N 19/167* (2014.11); *H04N 19/172* (2014.11)

(58) Field of Classification Search
CPC ............................ H04N 19/167; H04N 19/172
See application file for complete search history.

(56) References Cited

U.S. PATENT DOCUMENTS

| | | |
|---|---|---|
| 10,841,666 B1 | 11/2020 | Effinger et al. |
| 10,951,960 B1 | 3/2021 | Wu et al. |
| 2016/0165185 A1* | 6/2016 | Oyman ................. H04N 19/167 348/14.08 |
| 2020/0288149 A1* | 9/2020 | Mao ...................... H04N 19/176 |
| 2020/0322401 A1* | 10/2020 | Kieft ..................... H04L 65/764 |
| 2021/0390130 A1 | 12/2021 | Zhang et al. |

FOREIGN PATENT DOCUMENTS

EP    3706417 A2    9/2020

OTHER PUBLICATIONS

PCT Search Report and Written Opinion mailed Sep. 14, 2023 for PCT application No. PCT/US23/69236, 12 pages.

* cited by examiner

*Primary Examiner* — Kyle M Lotfi
(74) *Attorney, Agent, or Firm* — Lee & Hayes, P.C.

(57) ABSTRACT

A system for utilizing media content reference point information to perform media content encoding, and supplemental content stitching and/or insertion. Media content can be encoded and packaged based on boundaries of the media content. The boundaries can be received from a third-party and/or generated via an automated process. Target boundaries can be selected based on accuracy levels associated with the received and/or generated boundaries. Supplemental content can be stitched and/or inserted into packaged media content based on audio and video content of the packaged media content being aligned.

20 Claims, 7 Drawing Sheets

MEDIA CONTENT BOUNDARY-AWARE ENCODING

BACKGROUND

Options for consuming media content includes various types of media content (e.g., video, audio, etc.), providers of the media content, and devices for consuming the media content. Consumer and provider demands for management and support of complex and sophisticated media content related processes and services continue to increase in size and breadth.

Media content providers utilize various media content related operations to manage media content and supplemental content associated with the media content. The supplemental content may be provided with the media content that is downloaded by, or streamed to, consumer devices. Content insertion and media content stitching are widely utilized to enhance usability of the media content and the supplemental content. Media content reference identifiers may be utilized to manage and perform the media content stitching and the supplemental content insertion. The media content reference identifiers may be generated by various sources such as media content providers and third-party providers. However, media content compression efficiency management and/or encoding, which may be media content reference identifier agnostic, do not take media content reference identifiers into account. As a result, by not taking those media content reference identifiers into account, the media content reference identifiers cannot be honored during encoding of the media content, which may result in misalignment of supplemental content with respect to media content fragments during media content playback. Consequently, utilization of the supplementary content, and/or placement of the supplemental content in the media content, often results in discrepancies between various components of the media content, as well as between the supplemental content and the media content components.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
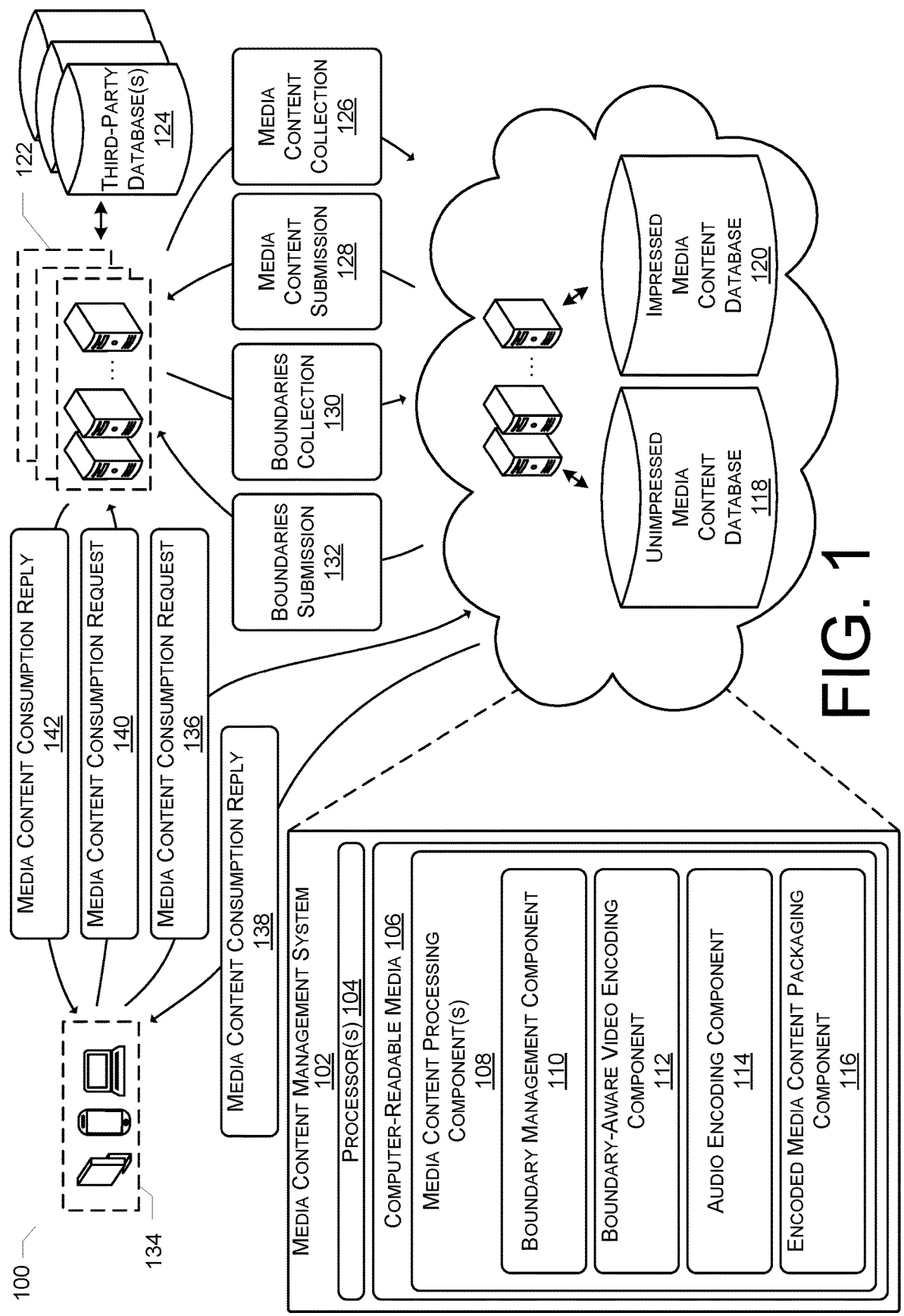
FIG. 1 is an illustrative environment for utilizing media content boundaries information to perform media content encoding, supplemental content stitching, and supplemental content insertion, in accordance with some examples of the present disclosure.

This disclosure is directed to techniques for utilizing media content boundaries information to perform media content encoding, and supplemental content stitching and/or insertion. The media content encoding can be performed based on requests associated with media content. The requests can include boundary information (e.g., boundaries, and/or reference identifiers (or "cue-points")) associated with duration locations (e.g., time-based locations) of portions of the media content. The boundaries can be associated with, and/or received from, various sources. The boundaries can be validated and utilized to identify target boundaries as attributes of the media content. The target boundaries can include selected boundaries having higher accuracy levels than remaining unselected boundaries of the received boundaries. An encoding process can be utilized to encode the media content data based on the target boundaries. Video content of the media content, which can be encoded via the encoding process, can be utilized to perform video-aware audio fragmentation of audio content of the media content. The audio content can be encoded, via the encoding process. The encoded media content can be packaged as packaged media content, based on the video-aware audio fragmentation to temporally align the encoded audio content with the encoded video content. for delivery to user devices, such that the audio content will be synchronized with the video content during playback. The packaged media content can include other types of temporally aligned content (e.g., thumbnails content (or "trick-play content"), subtitles content, etc.). The packaged media content can be transmitted to user devices along with supplemental content, which can be received from various devices, including third-party devices.

The requests associated with media content can be received from third-party devices and utilized to generate various types of reports. The requests can include metadata, third-party generated boundaries (or "external boundaries"), and/or boundary generation instructions (e.g., automated boundary generation instructions). The third-party generated boundaries can include boundaries generated via automated boundary generation and/or manual boundary generation. The requests and/or the automated boundary generation instructions can be utilized to generate computer vision/machine learning (CV/ML) boundaries. The CV/ML boundaries can be generated based on a 480p encode of the media content, which can be associated with default boundaries (e.g., boundaries generated based on the 480p encode). The reports can include a default report (e.g., a 480p encode report) associated with the default boundaries. The reports can include, based on performance of the automated boundary generation, a CV/ML report associated with the CM/ML boundaries. The reports can include a target report, which can be generated by consolidating the default report and the CV/ML report, based on boundary priority values. The target report can be utilized to package the encoded media content, or to transmit a feedback request to the third-party devices. The feedback request can be utilized to receive a feedback reply from the third-party devices. The target report can be modified, based on the feedback reply, to be a modified target report, which can be utilized to package the encoded media content.

The packaging process can utilize the supplemental content to package the encoded media content. The packaged media content, which can be utilized for supplemental content stitching and/or insertion, can be utilized to temporally align the supplemental content with different types (e.g., video content, audio content, thumbnails content, subtitles content, etc.) of the encoded media content. The supplemental content and the different types of the encoded media content can be temporally align based on the encoded video content having fragment breaks matching the encoded audio content. The content stitching and/or insertion can be performed based on commands received from the third-party device. The commands can be provided via operator input to the third-party device, based on a manifest link transmitted to the third-party device.

Furthermore, the techniques described herein provide various technical advantages for systems managing media content encoding, and supplemental content stitching and/or insertion. Various system resources (e.g., compute resources, storage resources, etc.) can be optimized by utilizing media content boundaries (e.g., reference identifiers) to encode and package video content and audio content. Because encoding the media content includes aligning the video content and the audio content, as well as other types of content, such as thumbnails content and subtitles content, system resources can be allocated for the encoding based on availability.

System resources can be utilized for media content encryption at low peak times and conserved for other higher priority tasks at high peak times. Packaging the encoded media content, which can generated utilizing video-aware audio fragmentation to encode the audio content, is more efficient than current techniques for aligning audio content with video content at playback. Reference point (or "boundary") aware media content encoding techniques as discussed herein utilize resources efficiently by not requiring more resource intensive content management processes to be performed on-demand at presentation time, as in techniques according to existing technologies.

System resources for supplemental content stitching and/or insertion can be efficiently utilized in combination with performance of media content encoding. By coordinating utilization of system resources at performance of media content encoding for the supplemental content stitching and/or insertion, the system resources that would otherwise be occupied at playback for the supplemental content stitching and/or insertion according to technology can be utilized for other purposes.

Moreover, the techniques described herein optimize network performance by integrating together various types of content, which can be efficiently transmitted. Network resources that would otherwise be required to separately transmit different types of content for playback of the content according to conventional technology, can be conserved for other purposes, thereby increasing network bandwidth and potentially decreasing latency resulting from an overburdened network. Overall amounts of data being transmitted according to the reference point aware media content encoding techniques discussed herein can be reduced, in comparison to techniques utilized to transmit data according to current technology. The encoded media content, which can include video content, audio content, thumbnails content, subtitles content, etc., can be packaged and transmitted together. By integrating the different types of data within the encoded media content, network overhead associated with the transmitted encoded media content can be reduced.

The methods, apparatuses, and systems described herein can be implemented in a number of ways. References are made to the accompanying drawings that form a part hereof, and in which are shown by way of illustration specific configurations or examples, in which like numerals represent like elements throughout the several figures.

FIG. 1 is an illustrative environment 100 for utilizing media content boundaries information to perform media content encoding, supplemental content stitching, and supplemental content insertion, in accordance with some examples of the present disclosure. The environment 100 can include a media content management system 102, which can include one or more processors 104 and computer-readable media 106. The computer-readable media 106 can be utilized to store one or more media content processing components 108. The media content processing component(s) 108 can include a boundary management component 110, a boundary-aware video encoding component (e.g., a reference identifier-aware video encoding component) 112, an audio encoding component 114, and an encoded media content packaging component 116. The media content management system 102 can include an unimpressed media content database 118 and an impressed media content database 120. The boundary management component 110 can be utilized to identify, generate, and/or receive, from one or more sources, one or more boundaries (e.g., reference identifier(s) (or "cue-point(s)")) associated with media content.

The boundary(ies) can include data identifying corresponding media content portion(s). By way of example, a boundary can identify a portion of media content (e.g., a movie, a show, etc.), the portion being of a duration (e.g., 1 second (s), 5 milliseconds (ms), 1 ms), etc.) that is less than or equal to an entirety or duration (e.g., total duration) of the media content. The boundary, which can be represented by, and/or generated with, an identifier (e.g., a boundary identifier), can be identified by a time (e.g., 0 years (y), 0 months (mo), 0 days (d), 0 hours (h), 1 m, 5 s, 4 ms) (or "0:0:0:0: 1:5:4") (or, more simply referred to herein, as "0:1:5:4") measured from a start time of the media content (e.g., 0 y, 0 mo, 0 d, 0 h, 0 m, 0 s, 0 ms) (or "0:0:0:0:0:0:0") (or, more simply referred to herein, as "0:0:0:0"). In some examples, for instance with the boundary of the media content being a cue-point, the cue-point can be associated with other media content (e.g., supplemental content) (e.g., product and/or service related content (or "advertisement(s)") (or "advertisement content"), auxiliary content (e.g., the same or similar content with some alterations and/or modifications, different content associated with, and/or related to, the media content in some way), scene and/or frame replacement content, etc.).

The media content can be encoded using the boundary(ies). Media content encoding can be performed to generate an encode (e.g., data, which can be generated as a file, including encode media content). In some examples, the media content encoding can be processed by converting media content (e.g., video content, audio content, thumbnails content, subtitles content, etc.) to digital media content (e.g., digital files) so that the media content can be saved as fluid video content. The media content being encoded can include content (e.g., video content) as raw content (e.g., raw video content), including individual images. Different types of the media content (e.g., video content, audio content, thumbnails content, subtitles content, etc.) can be aligned in the encoded media content based on the boundary(ies) being used to encode the media content.

Content stitching can include stitching media content (e.g., different media content streams) together to create linear content (e.g., a single linear content channel) from different channels. In some examples, the channels can include different types of content, such as video content (e.g., first video content) that includes a view (e.g., perspective from a location at an angle and a distance with respect to a viewing target, etc.) that is different from another view (e.g., another perspective from a location at an angle and a distance with respect to a viewing target, etc.) of other video content (e.g., second video content), based on different camera angles capturing an event (e.g., a live event, a sporting event, a concert, etc.). The different media content, including the different video content from the different channels, can be independently encoded and packaged, and then stitched together to provide a single presentation of the event at the user device(s) 134 in which the view switches among the different camera angles. The content stitching can be accurately performed based on the media content being encoded utilizing the boundary(ies).

Content stitching can include supplemental content stitching. Supplemental content stitching can include combining (e.g., stitching) one or more portions of the media content with the supplemental content. By way of example, supplemental content (e.g., a portion of the supplemental content) can be stitched with a first portion of the media content (e.g., a portion of the media content from a first boundary to a second boundary) and a second portion of the media content (e.g., a portion of the media content from a first boundary to a second boundary). In some examples, such as with a start of the first portion of the media content being a start of the media content (e.g., at 0:0:0:0), or with the first portion occurring at any time before the second portion, the supplemental content can be stitched between the first portion of the media content and the second portion of the media content. In those examples, an end of the first portion of the media content might coincide (e.g., occur without any intermediary content) with a beginning of the second portion of the media content. In other examples, an end of the first portion of the media content might not coincide (e.g., be separated from) from the beginning of the second portion of the media content by a third portion of the media content (e.g., the intermediary content). In those examples, the intermediary content might be removed, and/or be replaced by (e.g., substituted with), the supplemental content.

Content insertion (e.g., supplemental content insertion) can be utilized to insert supplemental content (e.g., a portion of the supplemental content) into media content (e.g., encoded media content). Supplemental content insertion can include virtual product placement (VPP). In some examples, supplemental content being inserted (e.g., stitched) can include a supplemental content representation (e.g., a visual and/or audible representation of a brand) (or "brand") (e.g., an advertisement) of a brand associated with a product and/or service. In those or other examples, the inserted supplemental content can include a supplemental content representation (e.g., VPP) (e.g., a visual and/or audible representation of a product) (or "product") of a product. The content insertion can be performed utilizing the content stitching and/or any type of insertion. The content insertion can include overlaying, inserting, adding, representing, etc., the supplemental content in the encoded media content. In some examples, the content insertion can include screen placement (e.g., placing the supplemental content in a video segment based on a screen portrayed in the video segment), script placement (e.g., placing the supplemental content in a video segment based on a portion of script associated with the video segment), plot placement (e.g., placing the supplemental content in a video segment based on a portion of plot represented in the media content, the portion of the plot being associated in the video segment), and or any other type of placement. The content insertion, which can be performed via programming associated with the encoded media content, can include inserting one or more dynamic billboard representations (e.g., representations of content associated with a product and/or a service) in a scene (e.g., a background of the scene) depicted during playback of the encoded media content.

Content stitching and/or insertion can be performed based on information associated with the media content management system 102, and/or information associated with, and/or received from, the third-party device(s) 122 and/or the user device(s). The information can include preference information (e.g., cost preference information, priorities associated with types of users to receive content, priorities associated with potential times of playback) associated with, and/or received from, the third-party device(s) 122, preference information associated with, and/or received from, the user device(s) 134, characteristics (e.g., industry type, business size, etc.) associated with, and/or received from, the third-party device(s) 122, and/or characteristics (e.g., demographics, account information, etc.) associated with, and/or received from, the user device(s) 134.

Different types of boundary(ies) can be identified and/or generated. The boundary(ies) can include service provider boundaries (e.g., internal boundaries generated via automated boundary generation and/or manual boundary generation), third-party generated boundaries (e.g., external boundaries generated via automated boundary generation and/or manual boundary generation), computer vision/machine learning (CV/ML) boundaries, and/or default boundaries (e.g., boundaries generated via a 480p encode). In some examples, the CV/ML boundaries can include service provider CV/ML boundaries and/or third-party CV/ML boundaries. In those or other examples, the default boundaries can be service provider default boundaries and/or third-party default boundaries. The boundaries can be utilized to generate target boundaries, such as by merging together the boundaries to select boundaries as the target boundaries, based on the selected boundaries (e.g., the boundaries selected to be utilized as the target boundaries) being identified as having higher accuracy levels than unselected boundaries (e.g., boundaries not utilized as the target boundaries).

In some examples, merging of the boundaries can include identifying priorities associated with different types of boundaries (e.g., priorities associated with corresponding service provider boundaries, priorities associated with corresponding third-party boundaries, priorities associated with corresponding default boundaries, priorities associated with corresponding CV/ML boundaries). The priorities, which can be identified by the media content management system 102, can include priorities generated by the media content management system 102 and/or the third-party device(s) 122; and/or the priorities can be identified based on preference information associated with the media content management system 102, the third-party device(s) 122, and/or the user device(s) 134. By way of example, any of the priorities and/or preference information can be received via media content consumption requests (e.g., the media content consumption request 136 and/or 140), ingestion content (e.g., the ingestion content 312, as discussed below with reference to FIG. 3) (e.g., the ingestion content 408, as discussed below with reference to FIG. 4), etc. The priorities can be utilized to select boundaries (e.g., identify the selected boundaries). In some examples, the priorities can include a priority for the selected boundaries to be based on time stamps associated with the media content, as discussed below.

In some examples, the CV/ML boundaries can be inferred by a CV/ML device (e.g., any device of the service provider, the third-party, etc.) to infer CV/ML generated boundaries utilizing a 480p encode (e.g., an encode at a 480p resolution, with a vertical resolution of 480 pixels) of the media content, the media content being analyzed by the 480p encode for instantaneous decoder refresh (IDR) frame placement. The 480p encode (e.g., data, which can be generated as a file, including encoded media content with a resolution of 480p) can be generated utilizing the media content. The media content can be encoded at the resolution of 480p to be the 480p encode. The IDR frame placement can be utilized to identify IDR frames and non-IDR frames in the media content, individual ones of the IDR frames being followed by at least one of the non-IDR frames. In some examples, the default boundaries can be at media content temporal locations (also referred to herein as "locations," for simplicity) (e.g., locations measured with respect to an initial temporal location (e.g., 0 years, 0 months, 0 days, 0 hours, 0 minutes, 0 seconds, 0 milliseconds (ms)) of the media content) identified with an encoder (e.g., an X264/5 encoder, an AV1 encoders, etc.) based on one or more encoder algorithms of the encoder, the locations being utilized to place the IDR frames. In those or other examples, the default boundaries can be identified and/or generated utilizing the 480p encode via analysis by a probe (e.g., an FFprobe) for the IDR frame placement locations.

The boundary-aware video encoding component 112 can be utilized to encode video content in the media content via an encoding process. The video content can be encoded utilizing the boundaries (e.g., the service provider boundaries, the third-party boundaries, the CV/ML boundaries, the default boundaries, the target boundaries, etc.). The video content being encoded can be fragmented, via video fragmentation, utilizing the boundaries. In some examples, the video content can be fragmented by placing IDR frames at boundaries (e.g., perforation points enabling alterations of the video content), fragmenting the video content utilizing the IDR frames to generate fragment boundaries, and segmenting the video content at that fragment frames for tailoring playback of the encoded video content.

The audio encoding component 114 can be utilized to encode audio content of the media content. The encoded audio content can be utilized to package the encoded media content.

The encoded media content packaging component 116 can be utilized to package the encoded media content. The media content, including the video content, the audio content, and/or other content (e.g., thumbnails content, subtitles content, etc.), being encoded as the encoded media content, can be impressed utilizing the supplemental content, as impressed media content, and packaged as packaged media content. The encoded media content can be packaged utilizing video-aware audio fragmentation, which can include video content-aware audio content encoding. Video content fragment can be utilized to fragment the video content. Fragmenting of the audio content can be performed in similar way as for the video content fragmenting, so as to align the encoded audio content (e.g., the audio content fragments) with the encoded video content (e.g., the video content fragments)

Packaging media content can include identifying that the media content has been encoded as the encoded media content, impressed utilizing the supplemental content, and packaged. The packaging can include generating packaged media content. The package media content can be generated as (e.g., data) (or "packaged data") with the encoded media content. The packaged media content can include portions of the media content encapsulated in different corresponding formats (e.g., media content formats that can be utilized during playback). The encapsulated media content portions can include media fragments, which can be delivered over the internet for playback (e.g., streaming) of the media content (e.g., the encapsulated media content portions). Playback of the media content device can be utilized by the user device(s) 134 to receive the media content (e.g., the encapsulated media content portions), to assemble the media content (e.g., put the media content, the file, back together). Using the encapsulated media content portions for the playback of the media content device enables the user device(s) 134 to switch between different formats (e.g., formats with different resolutions and/or different bitrates) depending on a quality of a network connection of the user device(s) 134.

In some examples, the formats can also include boundaries associated with different types of time information. Time information of the media content received from the third-party device(s) 122 can indicate that a media content format and/or one or more boundary(ies) are associated with time stamps, that a media content format and/or one or more boundary(ies) are associated with timecodes, that a media content format and/or one or more boundary(ies) associated with frame rates, and/or any other time information related to formats and/or boundary(ies). By way of example, the time stamps can include precise labels of time locations in video recordings, in order to know the exact time location of a recorded point in the content. In some examples, the time stamps can have formats of hours:minutes:seconds:milliseconds. By way of another example, the timecodes can be utilized as a way of precisely labeling frames in a video recording in order to know exact frame locations of recorded points in the media content. In some examples, the timecodes can have formats of hours:minutes:seconds:frames (e.g., 18:25:23:06). By way of another example, the frame rates can include measurements of how quickly numbers of frames appear within corresponding seconds (e.g., 24, 25, 30, etc., frames for each corresponding second of the media content).

In some examples, the formats associated with the encoded media content can utilize time stamps associated with the boundary(ies). The formats associated with the encoded media content can utilize the time stamps, based on initial time information in the received media content (e.g., an initial format of the received media content) (e.g., initial time stamps, initial time codes, and/or initial frame rates). For example, with instances in which the format of the received media content utilizes time stamps, timecodes, and/or frame rates, the time codes and/or the frame rates can be modified and/or replaced by the timecodes in the encoded media content.

Because timecodes (e.g., timecodes identifying integer numbers of frames respective to corresponding time locations at corresponding numbers of seconds from an initial time location), and possibly frame rates, may utilize whole rather than fractional frames during labeling of the media content, the encoded media content can be generated with formats utilizing time stamps. The time stamps may provide more accurate time locations in the encoded media content than, for example timecodes and/or frame rates that utilize integer numbers of frames, based on the time stamps identifying time locations of video contents that are integer frame rates and/or non-integer frame rates. The boundary(ies) in the encoded media content can be generated based on the formats utilizing the time stamps, which can be identified and/or generated during various processes (e.g., encoding of the media content).

Databases, which can include the unimpressed media content database 118 and the impressed media content database 120, can be utilized to store data (e.g., the media content, the encoded media content, the impressed media content, etc.) managed by the media content management system 102. In some examples, the media content (e.g., service-provider media content identified, and/or generated, by the media content management system 102) (e.g., media content (or "third-party generated media content") received from one or more third-party devices), or any other media content, can be stored in the unimpressed media content database 118. In some examples, the encoded media content, which can be impressed utilizing the supplemental content (e.g., supplemental content stitched with the encoded media content, supplemental content inserted for VPP, etc.), can be stored in the impressed media content database 120. The impressed media content stored in impressed media content database 120 can be utilized to generate the packaged media content for streaming and/or downloading, by the user device(s) 134, of the packaged media content.

Third-party content (e.g., the third-party boundaries, the third-party media content, supplemental content, etc.) can be identified and/or generated by third-party device(s) 122. By way of example, a third-party can be a company, business (e.g., an external business), or any type of provider of content (e.g., media content, supplemental content, etc.), products (e.g., computing products, network products, or any other types of products in any industry), services (e.g., computing services, network services, or any other types of services in any industry), etc. The third-party device(s) 122 can utilize third-party databases to store the third-party content. Some or all of the third-party content can identified and/or generated by the same, or different third-party device(s) 122 as other third-party content. By way of example, a first portion (e.g., a partial portion or an entire portion) of the third-party content (e.g., first third-party boundaries, first third-party media content, etc.) can be identified and/or generated by first third-party device(s) 122; and a second portion (e.g., a partial portion or an entire portion) of the third-party content (e.g., second third-party boundaries, second third-party media content, etc.) can be identified and/or generated by second third-party device(s) 122. In some examples, for instance with the first third-party content being received from different third-party device(s) than the second third-party content, the first third-party content (e.g., the first third-party boundaries and/or the first third-party media content) may be associated with the second third-party content (e.g., the third-party boundaries and/or the second third-party media content) and/or with other content (e.g., other third-party boundaries, other third-party media content, service-provider boundaries, service-provider media content, etc.). The third-party content (e.g., the third-party boundaries, the third-party media content, etc.) can be stored in third-party database(s) 124.

Content (e.g., media content and/or boundaries) can be exchanged between the media content management system 102, and the third-party device(s) 122. The media content management system 102 can receive (or "collect") third-party media content, and/or other data (e.g., metadata, etc.) associated with the received media content, from the third-party device(s) 122 via a media content collection message (or "media content collection") 126. The media content management system 102 can transmit media content (e.g., the packaged media content, the encoded media content, the service-provider media content, etc.), and/or other data (e.g., metadata, etc.) associated with the transmitted media content, to the third-party devices 122 via a media content submission message (or "media content submission") 128. The media content management system 102 can receive boundaries (e.g., the third-party boundaries, the third-party CV/ML boundaries, the third-party default boundaries, etc.), and/or other information associated with the third-party boundaries, via a boundaries collection message (or "boundaries collection") 130. The media content management system 102 can transmit boundaries (e.g., the service provider boundaries, the service provider CV/ML boundaries, the service provider default boundaries, etc.), and/or other information associated with the service provider boundaries, via a boundaries submission message (or "boundaries submission") 132. Any types of boundaries (e.g., media content reference identifiers) can be received via the boundaries collection and/or transmitted via the boundaries submission 132.

Playback of media content, by downloading and/or streaming the media content, can be managed for one or more user devices 134. The user device(s) 134 can request playback of media content (e.g., the packaged media content) stored in the media content management system 102 by transmitting a media content consumption request 136 to the media content management system 102. Media content playback can be performed for the user device(s) 134 via a media content consumption reply 138 received from the media content management system 102. The user device(s) 134 can request playback of media content (e.g., the packaged media content) stored in the third party device(s) 122 by transmitting a media content consumption request 140 to the third party device(s) 122. Media content playback can be performed for the user device(s) 134 via a media content consumption reply 142 received from the third party device(s) 122. In some examples, one or more media content consumption replies (e.g., the media content consumption reply 138, the media content consumption reply 142, etc.) can include an acknowledgement (or "confirmation") of the corresponding consumption request (e.g., the media content consumption request 136, the media content consumption request 140, etc.), and a portion (e.g., a partial portion or an entire portion) of the packaged media content. In those or other examples, a portion (e.g., a partial portion or an entire portion) can be transmitted in one or more media content communications associated with the corresponding the media content consumption reply.

The media content management system 102, the third-party device(s) 122, and/or the user device(s) 134 can communicate via one or more networks. The network(s) (e.g., the network(s) 612, as discussed below with reference to FIG. 6) can be utilized to exchange any communications (e.g., data or information) (or "messages") (or "signals") according to any techniques, as discussed herein.

Although packaged media content can be generated by packaging the encoded media content, as discussed above in the current disclosure, it is not limited as such. In some examples, packaging of the encoded media content can be interpreted as packaging of media content that has been encoded and impressed with the supplemental content (e.g., supplemental content stitched with the encoded media content, and/or inserted for VPP), and utilized to implement any of the techniques as discussed throughout this disclosure. In those or other examples, the packaging can be performed on the impressed media content stored in the impressed media content database 120, and utilized for streaming and/or downloading, by the user device(s) 134, of the packaged media content.

As a hypothetical example, the media content management system 102 can obtain a movie or show, as a media file from the unimpressed media content database 118 or from the third-party database(s) 124. The media file can include video content and audio content, and possibly thumbnails and subtitles, as well. The media content management system 102 can identify cue-points associated with the video previous received from the third-party device(s) 122, and/or retrieve, from the third-party device(s) 122, the cue-points. Alternatively or additionally, boundary(ies) without specific information in the cue-points (e.g., boundary(ies) identifying fragments of the video, but not associated with placement of any other content) can be utilized instead of the cue-points.

In the hypothetical example, the media content management system 102 can utilize the cue-point(s) and/or the boundary(ies) to package the video content and the audio content, and any other content received in the media file. The cue-point(s) and/or the boundary(ies) can be utilized to identify fragments of the video and the audio content can be synchronized by identifying and/or generating audio fragments of a same size as the video fragments, and then aligning the audio fragments with the video fragments. The audio fragments aligned with the video fragments can be generated such that, from a beginning of the audio fragments, a first audio fragment is aligned with a first video fragment. Other content, if any, associated with thumbnails and/or subtitles can be aligned in a similar way. All of the content can be encoded and packaged into a file, such that all of the content is synchronized at playback (e.g., streaming) of the file.

The packaged media content can be stitched together with supplemental content, such content related to a third-party, which can be an external business. The supplemental content can be received from third-party device(s) 122 of the third-party, and/or generated by the media content management system 102. The packaged media content can be stitched together based on a request from a user device. The media content management system 102 can identify the supplemental content based on preferences received from the business (e.g., a business campaign) and/or based on characteristics of the user of the user device. For example, content associated with the business campaign and/or content considered to be of interest to the user device can be stitched into the packaged file. Alternatively or in addition, VPP can be utilized to augment a segment (e.g., a video content segment, which can be associated with a corresponding audio content segment) of the encoded media content. The segment can be identified by a fragment boundary (e.g., a temporal location), identifying a start of the segment. Augmenting the encoded media content segment can include inserting a brand into the packaged file in a similar way as for the stitched content. The VPP and the stitched content can be accurately aligned with portions of the video, since information associated with the boundary(ies) accurately identifies portions (e.g., scenes, etc.) of the video used for the stitching or the VPP.

Figure 2:
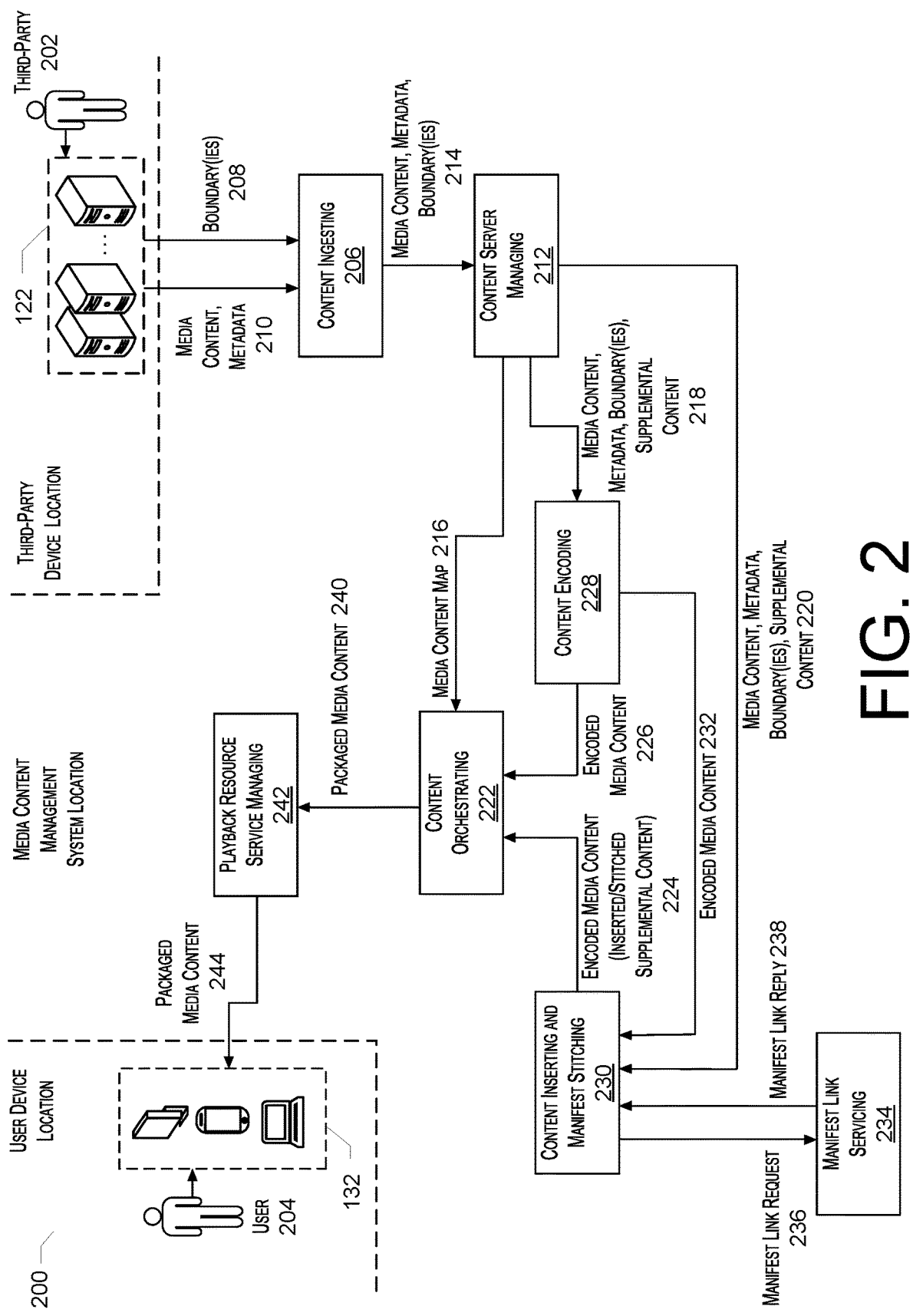
FIG. 2 is a schematic diagram of components utilized to perform media content encoding, supplemental content stitching, and supplemental content insertion, in accordance with at least one embodiment.

FIG. 2 is a schematic diagram 200 of components utilized to perform media content encoding, supplemental content stitching, and supplemental content insertion, in accordance with at least one embodiment. The components can be included in a media content management system (e.g., the media content management system 102), which can exchange communications with a third-party system (e.g., a system including one or more of the third-party device(s) 122) of a third-party 202 and/or the user device(s) 134 of a user (or "client") 204).

The media content management system (e.g., the media content management system 102) can include a content ingesting component (or "content ingesting") 206. The content ingesting 206 can receive one or more boundaries (or "media content boundary(ies)") (e.g., media content reference identifier(s)") 208, and media content and/or metadata (or "media content, metadata") 210. The boundary(ies) 208 can be associated with the media content, metadata 210, which can include metadata associated with the media content. In some examples, the boundary(ies) 208, can be include any of the third-party boundary(ies) (e.g., the third-party CV/ML boundaries, the third-party default boundaries, etc.) received via the boundaries collection 130, as discussed above with reference to FIG. 1. In some examples, the media content, metadata 210, can be include any of the media content and associated data received via the media content collection 126, as discussed above with reference to FIG. 1.

In some examples, the content ingesting 206 can receive, separately from, or in combination with the media content, metadata 210 and/or the boundary(ies) 208, information (or "supplemental content information") associated with supplemental content, information associated with the media content, metadata 210, information (or "boundary(ies) information") associated with the boundary(ies) 208, information (e.g., device characteristics and/or capabilities) associated with the third-party device(s) 122, and/or information (e.g., third-party information associated with a third-party account, etc.) associated with the third-party 202. The supplemental content information can include identifiers of product and/or services associated with the third-party device(s) 122 and/or the third-party 202.

In some examples, the content ingesting 206 can receive, separately from, or in combination with the media content, metadata 210 and/or the boundary(ies) 208, one or more requests associated with the supplemental content, and/or information (or "third-party request information") associated with the request(s). The request(s) can be associated with content insertion, content stitching, etc. The third-party request information can include data (e.g., identifiers, characteristics, etc.) associated with the supplemental content (e.g., instructions for management and/or performance of the content insertion, the content stitching, etc.). The request(s) can include information utilized to identify how, and at which times/cases, to perform content stitching and/or insertion, information about which media content is to be used for the content stitching and/or insertion, and/or information indicating which of the user device(s) 134 are to receive the media content with stitched and/or inserted content, and/or any other type of information usable for performing the content stitching and/or insertion. The request(s) can include any types of requests utilizing the information associated with the media content management system 102, and/or information associated with, and/or received from, the third-party device(s) 122 and/or the user device(s), as discussed above with reference to FIG. 1.

The content ingesting 206 can manage the media content, metadata 210 and the boundary(ies) 208. Management of the media content, metadata 210 and the boundary(ies) 208 can include identifying and/or receiving information associated with offers and/or potential offers for sale of the media content. Any information identified and/or received by the content ingesting 206 can be combined, merged, and/or integrated by the content ingesting 206, as ingest information (e.g., information including the media content, metadata 210, the boundary(ies) 208, the information associated with offers and/or potential offers for sale of the media content, etc.). The ingest information can include media content, metadata, and boundary(ies) (or "media content, metadata, boundary(ies)") 212.

The media content, metadata, boundary(ies) 212 can be utilized by, and/or transmitted to, a content server managing component (or "content server managing") 214. The content server managing 214 can identify and/or receive the media content, metadata, boundary(ies) 212, and determine one or more destinations for some or all of the media content, metadata, boundary(ies) 212. The destination(s) can be determined based on information (e.g., the supplemental content information, the boundary(ies) information, the third-party information, the third-party request information, etc.) identified, and/or received, by the content ingesting 206, from the third-party device(s) 122.

The content server managing 212 can identify a media content map 216, media content, metadata, boundary(ies), supplemental content 218, and media content, metadata, boundary(ies), supplemental content 220, based on the media content, metadata, boundary(ies) 212. The media content map 216 can be a map identifying the boundary(ies) 212, with respect to the media content. The map can include identifiers of the temporal locations of the boundary(ies), and/or fragments (e.g., video fragments, audio fragments, thumbnails fragments, subtitles fragments, etc.) identified and/or generated based on the boundary(ies). The supplemental content of 218 can be the same as, or different from, the supplemental content of 220. In some examples, with the content server managing 212 determining that content insertion and/or stitching is not to be performed, based on the information (e.g., the supplemental content information, the boundary(ies) information, the third-party information, the third-party request information, etc.) identified, and/or received, by the content ingesting 206, the content server managing 212 can utilize the supplemental content of 218 (e.g., supplemental content utilizable for content encoding but not for insertion and/or stitching). In other examples, with the content server managing 212 determining that content insertion and/or stitching is to be performed, based on the information identified, and/or received, by the content ingesting 206, the content server managing 212 can utilize the supplemental content of 220 (e.g., supplemental content utilizable for encoding, as well as insertion and/or stitching).

The content server managing 212 can identify (e.g., generate and an identifier) and/or transmit the media content map 216 for utilization by a content orchestrating component (or "content orchestrating") 222. The content orchestrating 222 can identify and/or receive the media content map 216, as well as other information (e.g., encoded media content (inserted/stitched supplemental content) 224 and encoded media content 226, as discussed below), to package the media content.

In some examples, for instance with the supplemental content information indicating content insertion and/or stitching is not to be performed, the media content, metadata, boundary(ies), the supplemental content 218 can be utilized, identified, and/or received, by a content encoding component (or "content encoding") 228. In those or other examples, the information of 218 can be identified via one or more identifiers generated by the content server managing 212. The content encoding 228 can utilize the information of 218 to encode the media content as encoded media content 226.

In some examples, for instance with the supplemental content information indicating content insertion and/or stitching is to be performed, the media content, metadata, boundary(ies), supplemental content 220 can be utilized, identified, and/or received, to a content inserting and manifest stitching component (or "content inserting and manifest stitching") 230. In those or other examples, the information of 220 can be identified via one or more identifiers generated by the content server managing 212.

The content inserting and manifest stitching 230 can utilize the information of 220 to encode the media content as encoded media content 232, and to perform requested processes utilizing the supplemental content (e.g., to insert the supplemental content into the media content and/or to stitch the supplemental content with the media content), as discussed above with reference to FIG. 1, based on the information received by the content ingesting 206 from the third-party device(s) 122. In some examples, the content inserting and manifest stitching 230 can be utilized to generate a manifest, and to insert the supplemental content into the media content, based on the information received by the content ingesting 206 indicating some or all of the supplemental content is to be inserted into the media content. In those or other examples, the content inserting and manifest stitching 230 can stitch the supplemental content with the media content, based on the information received by the content ingesting 206 indicating some or all of the supplemental content is to be stitched with the media content.

In some examples, the content insertion and manifest stitching 230 can utilize the supplemental content to perform the content inserting and/or stitching, based on the supplemental content having not been previously identified and/or received. In other examples, the content insertion and manifest stitching 230 can utilize the supplemental content to perform the content inserting and/or stitching, based on a portion (e.g., a partial portion or an entire portion) of the supplemental content having not been previously identified and/or received. The content insertion and manifest stitching 230 can identify, via a manifest link servicing component (or "manifest link servicing") 234, the portion of the supplemental content. In those examples, the portion of the supplemental content can be obtained by the manifest link servicing 234 based on a manifest link request (e.g., a request with a manifest link) 236 (e.g., a request identified and/or generated by the content insertion and manifest stitching 230). In those examples, the portion of the supplemental content to be inserted and/or stitched can be received by the manifest link servicing 234 and from the third-party device(s) 122, based on a third-party manifest link request transmitted by the manifest link servicing 234 and to the third-party device(s) 122. The manifest link servicing 234 can identify and/or generate a manifest link reply 238, based on the manifest link servicing 234 receiving, from the third-party device(s) 122, the portion of the supplemental content to be inserted and/or stitched (e.g., the manifest link servicing 234 can receive, via a third-party manifest link reply, the portion of the supplemental content to be inserted and/or stitched). The manifest link reply 238 can be utilized by the content insertion and manifest stitching 230 to perform the encoding, and the content insertion and/or the stitching. The content insertion and manifest stitching 230 can generate encoded media content, including inserted and/or stitched supplemental content (or "encoded media content (inserted/stitched supplemental content") 224, based on the performing of the content insertion and/or the stitching.

Supplemental content to be inserted and/or stitched (e.g., supplemental content processed by the manifest link servicing 234), and/or boundaries (e.g., boundaries processed by the manifest link servicing 234) associated with the supplemental content, can be received from the third-party device(s) 122. In some examples, the supplemental content and/or the boundaries can be received from the third-party device(s) 122, based on at least one selection received via operator input to third-party device(s) 122. The selection(s) can include a selection of the manifest link, one or more selections identifying the supplemental content, and/or one or more selections identifying the boundaries.

In some examples, the received boundaries (e.g., the boundaries processed by manifest link servicing 234) can include cue-points. The cue-points can identify segments (e.g., segments generated via fragmentation of the media content) of the encoded media content. By way of example, a cue-point can identify a segment of the encode media content to be utilized for supplemental content insertion (e.g., content stitching or VPP).

In some examples, the boundaries (e.g., the cue-points) received via the selection(s) associated with the manifest link can have higher accuracy (or "precision") levels than for the boundaries (e.g., the cue-points) 208 received via the content ingesting 206. The accuracy (or "precision") levels of the boundaries (e.g., the cue-points) received via the selection(s) associated with the manifest link can be higher than for the boundaries (e.g., the cue-points) 208, based on the portions (e.g., the video content, the audio content, the subtitles content, the thumbnails content, etc.) of the encoded media content being synchronized during packaging.

By way of example, individual ones of at least one first level of precision can be associated with alignment between the at least one corresponding first cue-point (e.g., a cue-point received as a boundary 208) (or "best-effort cue-point") and at least one corresponding first segment of the media content). Alternatively or additionally, individual ones of at least one second level of precision can be associated with alignment between at least one corresponding second cue-point (e.g., a cue-point received via selection of the manifest link) (or "exact cue-point") and at least one corresponding second segment of the encoded media content. Alternatively or additionally, individual ones of the at least one second level of precision can be equal to or greater than the individual ones of the at least one first level of precision.

Supplemental content (e.g., the supplemental content of the media content, metadata, boundary(ies), supplemental content 220) to be inserted (e.g., inserted via stitching or VPP) can be identified, determined, and/or selected in various ways. The supplemental content to be inserted can be identified from any supplemental content (e.g., the supplemental content processed by the content ingesting 206, the supplemental content received via the manifest link servicing 234, etc.) received from any of the third-party device(s) 122, and/or supplemental content generated by the media content management system 102. In some examples, the supplemental content to be inserted can be selected by the content inserting and manifest stitching 230, and/or another component of the media content management system 102.

Selecting of the supplemental content to be inserted can be selected based on one or more preferences of the media content management system 102. The preference(s) can include a campaign preference, such as a preference of the media content management system 102 associated with a campaign (e.g., an advertising campaign, a marketing campaign, a product development campaign, etc.). In some examples, the supplemental content to be inserted can be selected based on characteristics (e.g., industry type, business size, etc.) associated with, and/or received from, the third-party device(s) 122 (e.g., the third-party device(s) from which the supplemental content was received), and/or characteristics (e.g., demographics, account information, etc.) associated with, and/or received from, the user device(s) 134 (e.g., the user device(s) 134 to which the packaged media content will be received). The supplemental content to be inserted can be based on a variety of different supplemental content received from numerous different third-party device(s) 122, any number of which can be associated with numerous different third-parties.

As a hypothetical example, the media content management system 102 can identify information (e.g., campaign information) associated with one or more campaigns. The campaign information can be received by one or more selections via operator input to the media content management system 102, and/or by any other process (e.g., the campaign information can be received by the media content management system 102 and from any other device). The campaign information can identify a campaign for a product, such as a particular brand of beverage. The supplemental content can be inserted, such as by stitching advertisements into the packaged media content or by VPP of the brand in the packaged media content (e.g., the media content to be streamed and/or downloaded). Insertion of the supplemental content can be repeated for any number and/or type of media content to be streamed/downloaded, until the number meets or exceeds a threshold number. The threshold number can be identified by the campaign information.

In the hypothetical example, the threshold number associated with the number of times the supplemental content is inserted can be identified based on a preference of the campaign. The campaign information can indicate a larger threshold number to advertise a more widely known brand of beverage, for example, a greater number of times for a lesser known brand of beverage. Alternatively, the campaign preference can indicate a larger threshold number for a brand of beverage to increase recognition, sales, etc. of the brand of beverage, irrespective of how widely know it is. By way of example, the brand of beverage might be identifiable as being associated with a plot theme, a type of character, a portion of a script, etc. (e.g., a type of beverage popular with kids can be advertised in a movie or show oriented toward a young audience). After the number of supplemental content insertion meets or exceeds the threshold number, subsequent insertions of supplemental content can utilize initial supplemental content (e.g., supplemental content identified for insertion prior to beginning the campaign).

The content orchestrating 222 can package the encoded media content (inserted/stitched supplemental content) 224 and/or encoded media content 226, as packaged media content 240, based on the media content map 216. The packaged media content 240 can include, as discussed above with reference to FIG. 1, the video content, the audio content, the thumbnails content, and the subtitles content, being temporally aligned.

The content orchestrating 222 can identify and/or transmit the packaged media content 240 to a playback resource service managing component (or "playback resource service managing") 242. The playback resource service managing 242 can prepare the packaged media content 240 for playback to the user device(s) 134. The preparing of the packaged media content 240 can include preparing the packaged media content 240 to be streamed and/or downloaded.

The playback resource service managing 242 can transmit the packaged media content 244 to the user device(s) 134. The transmitting of the packaged media content 244 can include streamlining the packaged media content 244, and/or transmitting the packaged media content 244 for download, via the media content consumption reply 138, as discussed above with reference to FIG. 1. The packaged media content 244 can be streamed and/or transmitted based on the information received from the user device(s) 134 (e.g., information received for the media content consumption request 136, as discussed above with reference to FIG. 1).

Although the packaged media content 244 can be transmitted by the media content management system 102 and to the user device(s) 134 as discussed above in this disclosure, it is not limited as such. In some examples, the packaged media content 244 can be transmitted by the media content management system 102 and to the third-party device(s) 122. The third-party device(s) 122 can utilize the packaged media content 244 for transmission to the user device(s) 134 via the media content consumption request 140 and the media content consumption reply 142, as discussed above with reference to FIG. 1, in a similar way as for the packaged media content 244 being transmitted by the media content management system 102.

Figure 3:
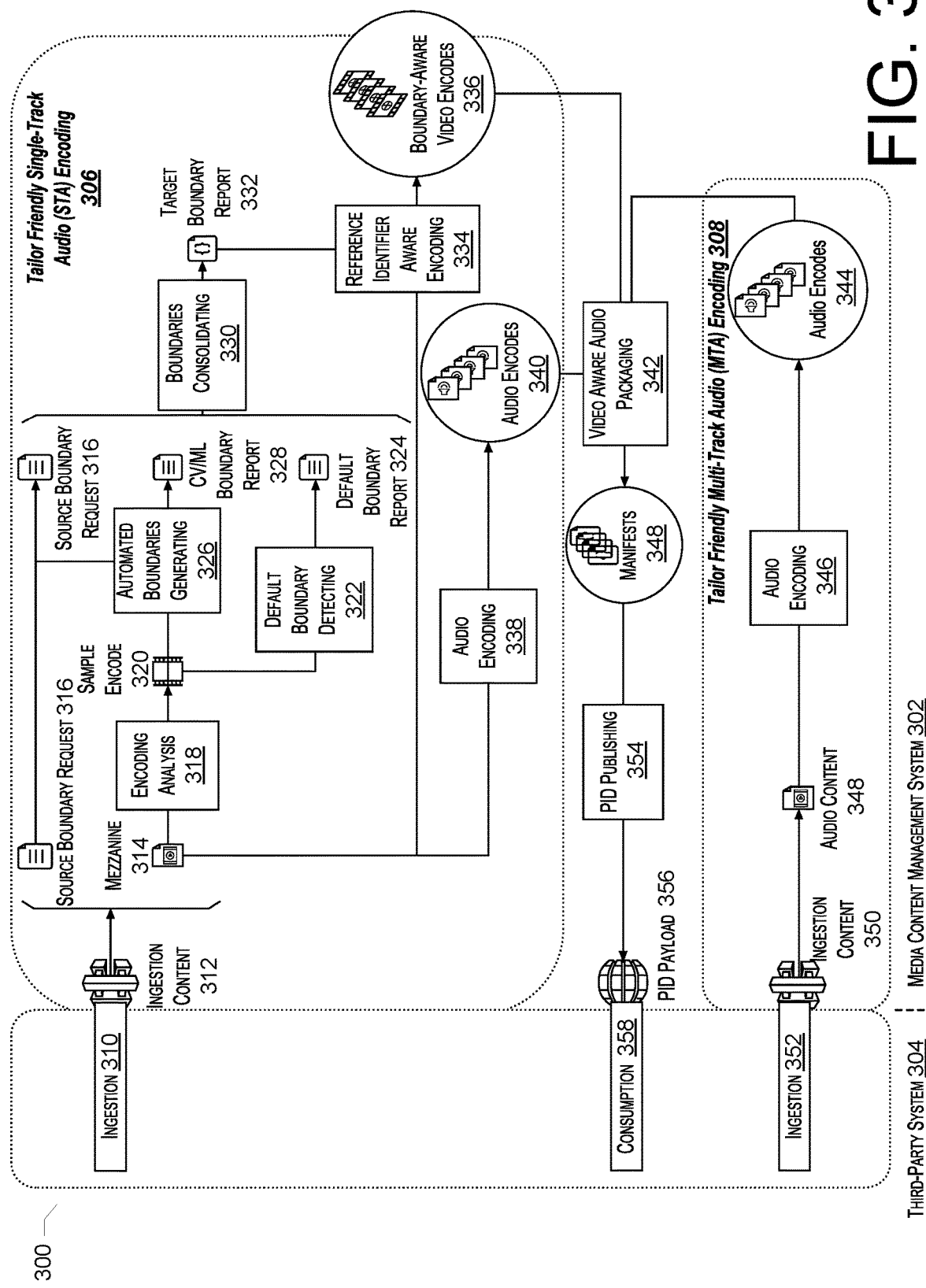
FIG. 3 is a schematic diagram of media content management components utilizing a feedforward mode to perform media content encoding, supplemental content stitching, and supplemental content insertion, in accordance with at least one embodiment.

FIG. 3 is a schematic diagram 300 of media content management components utilized in a feedforward mode to perform media content encoding, supplemental content stitching, and supplemental content insertion, in accordance with at least one embodiment. The components can be included in a media content management system 302, which can be implemented as the media content management system 102. The media content management system 302 can be communicatively coupled with a third-party system 304, which can be implemented as a system including any of the third-party device(s) 122.

The media content management system 302 can be utilized to perform tailor friendly single-track audio (STA) encoding 306 and/or tailor friendly multi-track audio (MTA) encoding 308. The tailor friendly single-track audio (STA) encoding 306 can be utilized to encode media content that has STA (e.g., an audio track in a single language), and, possibly, include additional audio content (e.g., one or more audio tracks in corresponding language(s)) in the encoded media content via the tailor friendly MTA encoding 308.

The media content management system 302 can include an ingestion component (or "ingestion") 310 to receive content (e.g., media content, third-party requests, etc.) from the third-party system 304. The media content can include video content, audio content, and/or other content (e.g., thumbnails content, subtitles content, etc.). The media content can be ingested as ingestion content 312. The ingestion content 312 can include one or more full-resolution files (e.g., a file including video content capable of output at a bit rate of 1.2-1.5 gigabits per second (Gbps)) and/or a mezzanine file, such as a mezzanine file (or "mezzanine") 314, which can be one or more compressed video files, which can take up less space than the full-resolution file. In some examples, the mezzanine 314 can be generated by the third-party system 304 and provided to the media content management system 302, and/or an identifier associated with the mezzanine 314 can be generated by the third-party system 304 and provided to the media content management system 302 to enable the media content management system 302 to access a portion (e.g., a partial portion or an entire portion) the mezzanine 314. The third-party requests in the received can include a source boundary request 316. The source boundary request 316, which can be a request for identification and/or generation of one or more boundaries (e.g., boundary(ies) associated with the ingested media content (or "source")), can be utilized by the tailor friendly STA encoding 306 for the identification and/or the generation of the boundary(ies), including for boundary consolidation.

The tailor friendly STA encoding 306 can include an encoding analysis component (or "encoding analysis") 318, which can utilize the mezzanine 314 to encode the video content (e.g., the mezzanine 314). The encoding analysis 318 can process the mezzanine 314 to generate a sample encode (or "480p encode") 320 (e.g., a file including video content capable of output a bit rate of 250 Mbps), in a similar way as discussed above with reference to FIG. 1.

The encoding analysis 318 can be utilized to generate the sample encode 320, such that the sample encode 320 can be used to serve as a reference for any objective time stamps (e.g., time stamps inferred from video streams generated by, and/or approved by, the media content management system 302 as being accurate for boundary referencing). Time stamps (e.g., subjective time stamps associated with the mezzanine 314) can be converted to the objective time stamps, which can be performed internally by the media content management system 302 and/or with feedback with third-parties (e.g., content providers, content generators, media studios, etc.). The sample encode 320 can include the objective time stamps.

The tailor friendly STA encoding 306 can include a default boundary detecting component (or "default boundary detecting") 322. The default boundary detecting 326 can be utilized to generate a default boundary report 324, which can include one or more default boundaries. The default boundary(ies) can be generated utilizing the 480p encode, in a similar way as discussed above with reference to FIG. 1.

The tailor friendly STA encoding 306 can include an automated boundaries generating component (or "automated boundaries generating") 326, which can utilize the source boundary request 316 and the sample encode 320. The automated boundaries generating 326 can be utilized to generate boundary(ies), and/or one or more boundary reports, based on the source boundary request 316. The boundary reports can include a boundary report (or "computer vision/machine learning (CV/ML) report") 328 associated with the boundary(ies) (e.g., CV/ML boundary(ies)), CV/ML boundary report being a report (e.g., data) generated utilizing a CV/ML device and/or a CV/ML model managed by the CV/ML device. The CV/ML boundary report 328 can include the CV/ML boundary(ies), and/or one or more corresponding identifiers associate with the boundary(ies). The CV/ML boundary(ies) can be generated utilizing the 480p encode in a similar way as discussed above with reference to FIG. 1.

The tailor friendly STA encoding 306 can include a boundaries consolidating component (or "boundaries consolidating") 330. The boundaries consolidating 330 can receive the CV/ML boundary report 328 from the automated boundaries generating 326, and the default boundary report 324 from the default boundary detecting 322. The boundaries consolidating 330 can be utilized to consolidate different sets of different types of boundaries, such as a set of boundaries (e.g., the default boundary(ies)) identified by, and/or received from, the default boundary detecting 322, and a set of boundaries (e.g., the CV/ML boundary(ies)) identified by, and/or received from, the CV/ML boundary report 328, and any other boundary reports and/or sets of boundaries of any type (e.g., the third-party boundary(ies), the service provider boundary(ies), etc., as discussed above with reference to FIG. 1). The different sets of different types of boundaries can be consolidated by the boundaries consolidating 330, based on the source boundary request 316.

The boundaries consolidating 330 can analyze the received boundaries and identify which of the received boundaries are the most accurate. The boundaries consolidating 330 can analyze individual boundaries of the received sets of boundaries corresponding to a portion of the media content (e.g., media content portion at time measured from a start of the media content). By way of example, the boundaries consolidating 330 can analyze a default boundary and a CV/ML boundary for a portion of the media content, and identify an accuracy level of the default boundary and an accuracy level of the CV/ML boundary. The accuracy levels can be determined utilizing the objective time stamps in the sample encode 320. The boundaries consolidating 330 can identify which of the default boundary and the CV/ML boundary is the more accurate boundary, based on the corresponding accuracy levels.

The boundaries consolidating 330 can generate a target boundary report 332 based on consolidation utilizing the default boundary report 324, the CV/ML boundary report 328, and/or any other reports. The target boundary report 332 can identify and/or include target boundaries identified as the most accurate boundaries by the boundaries consolidating 330.

The boundaries consolidating 330 can identify and/or provide the target boundary report 332 to a reference identifier aware encoding component (or "reference identifier aware encoding") 334. The reference identifier aware encoding 334 can utilizes the target boundary report 332 to encode video content of the mezzanine 314. The video content can be encoded utilizing the target boundary(ies) in a similar way as discussed above with reference to FIG. 1. The reference identifier aware encoding 334 can encode the video content as one or more encodes (e.g., boundary-aware video encodes 336). The encoded video content can include video fragments corresponding to the boundaries.

The tailor friendly STA encoding 306 can include an audio encoding component (or "audio encoding") 338. The audio encoding 338 can be utilized to encode audio content of the mezzanine 314. The audio content can be encoded by the audio encoding 338 utilizing one or more audio encodes (e.g., audio encodes 340) (e.g., audio content of the received media content that has been encoded).

The tailor friendly STA encoding 306 can include a video aware audio packaging component (or "video aware audio packaging") 342. The video aware audio packaging 342 can be identify and/or receive the boundary-aware video encodes 336 and the audio encodes 340. The boundary-aware video encodes 336 and the audio encodes 340 can be processed by the video aware audio packaging 342 to package the encoded video content with the encoded audio content.

The encoded video content can be packaged with the encoded audio content by performing, via the video aware audio packaging 342, fragmentation on the audio content to generate audio fragments aligned with the video fragments. The video aware audio packaging 342 can then perform segmentation on the fragmented video content and the fragmented audio content, such that segments (or "portions") of the video content (e.g., segmented video content) align with segments of the audio content (e.g., segmented audio content).

The video aware audio packaging 342, which can include the segmented audio content and the segmented video content, and/or include identifiers associated with the segmented audio content and the segmented video content, can identify and/or include any other content, such as audio encodes 344. The audio encodes 344 can include encodes associated with different types of audio content (e.g., audio content of different languages). The audio encodes 344 can be identified and/or generate by an audio encoding component (or "audio encoding") 346 based on audio content 348, in a similar way as for the audio encodes 344 identified and/or generated by the audio encoding 338 based on the audio content in the mezzanine 314. The audio content 348 can be identified and/or received, based on ingestion content 350, which can be received as the audio content 348 from an ingestion component (or "ingestion") 352. The ingestion 352 can be identified and/or transmitted by the third-party system 304.

The video aware audio packaging 342 can identify and/or provide the packaged media content (e.g., content including the segmented video content and the segmented audio content) via manifests 348. Alternatively or in addition, the video aware audio packaging 342 can identify and/or provide identifiers of the packaged media content via the manifests 348. The manifests 348 can include entries of identifiers (e.g., cue-points) indicating (e.g., pointing) to corresponding fragments (e.g., audio fragments and video fragments) being aligned such as to ensure synchronization of content (e.g., video content, audio content, and/or any other types of content, such as thumbnails content, subtitles content, etc.) during playback. In some examples, the manifests 348 can be generated based on a manifest link request (e.g., the manifest link request 236, as discussed above with reference to FIG. 2. In some examples, the manifests 348 can include content that is stitched and/or inserted, as discussed above with reference to FIG. 1.

The tailor friendly STA encoding 306 can include a packet identifier (PID) publishing component (or "PID publishing") 354 to publish the file (or "media content file") with the packaged media content via manifests 348. By way of example, publishing the media content file via a manifest 348 can include identifying information utilized for playback of the packaged video content. In some examples, the publishing can be utilized during playback to identify portions of the video content being viewed to transmit the video content portions to a video decoder for processing, such that the encoded video content can be decoded and presented by a user device (e.g., the user device(s) 134, as discussed above with reference to FIG. 1).

The PID publishing 354 can publish the media content file via the manifest 348 as a PID payload 356, which can be identified by, and/or received by, a consumption component (or "component") 358. The consumption 358 can be utilized to transmit the media content file (e.g., the portions of the media content file) during playback (e.g., streaming, downloading, etc.) for a user device (e.g., a user device 134).

Although the mezzanine 314 can be utilized in various ways for the tailor friendly STA encoding 306 and/or the tailor friendly MTA encoding 308, as discussed above in the current disclosure, it is not limited as such. In some examples, any media content (e.g., full-resolution media content, and or any other resolution media content, and/or any corresponding file(s), can be utilized in a similar way as for the mezzanine 314 to implement any of the techniques discussed throughout this disclosure.

Figure 4:
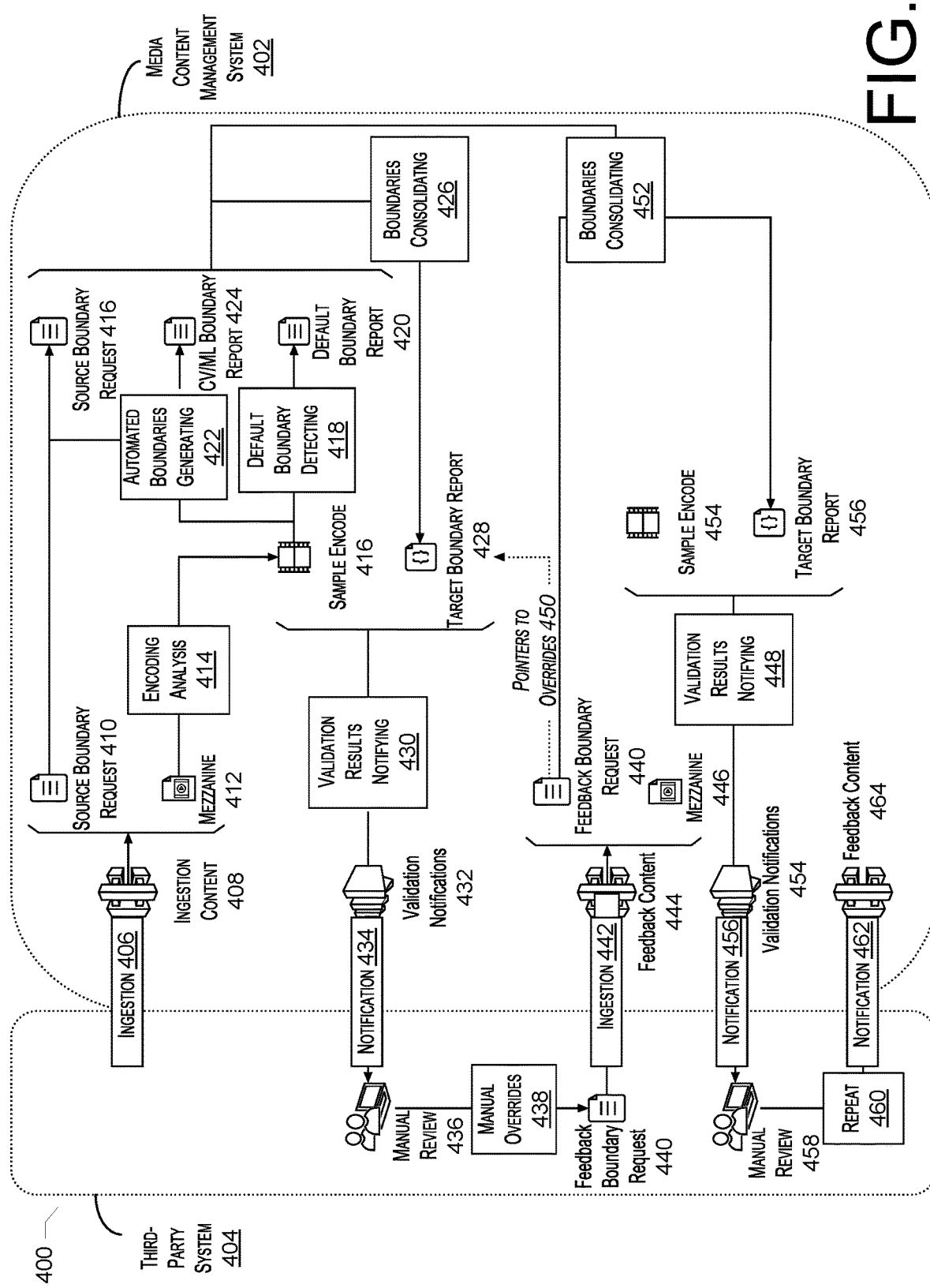
FIG. 4 is a schematic diagram of media content management components utilizing a feedback mode to perform media content encoding, supplemental content stitching, and supplemental content insertion, in accordance with at least one embodiment.

FIG. 4 is a schematic diagram 400 of media content management components utilizing a feedback mode to perform media content encoding, supplemental content stitching, and supplemental content insertion, in accordance with at least one embodiment. One or more of the components can be included in a media content management system 402, which can be implemented as the media content management system 102. One or more of the components can be included a third-party system 404, which can be implemented as a system including any of the third-party device(s) 122.

The media content management system 402 can include an ingestion 406 to provide ingestion content 408, a source boundary request 410, and a mezzanine 412, in a similar way as the ingestion 310 providing the ingestion content 312, the source boundary request 316, and the mezzanine 314, as discussed above with reference to FIG. 3. The media content management system 402 can include an encoding analysis 414 to process the mezzanine 412, in a similar way as the encoding analysis 318 processing the mezzanine 314, as discussed above with reference to FIG. 3. The encoding analysis 414 can identify and/or generate the sample encode 416, in a similar way as for the sample encode 320, as discussed above with reference to FIG. 3. The media content management system 402 can include a default boundaries detecting 418 to identify and/or generate a default boundary report 420, in a similar way as the default boundaries detecting 322 identifying and/or generating the default boundary report 324, as discussed above with reference to FIG. 3. The media content management system 402 can include an automated boundaries generating 422 to identify and/or generate the CV/ML boundary report 424, in a similar way as the automated boundaries generating 326 identifying and/or generating the CV/ML boundary report 328, as discussed above with reference to FIG. 3. The media content management system 402 can include a boundaries consolidating 426 to identify and/or generate a target boundary report 428, in a similar way as the boundaries consolidating 330 identifying and/or generating the target boundary report 332, as discussed above with reference to FIG. 3.

The target boundary report 428 can be utilized, along with the sample encode 416, by a validation result notifying component (or "validation result notifying") 430, instead of the being utilized to perform the reference identifier aware encoding, as for the target boundary report 332 being utilized by the reference identifier aware encoding 334, as discussed above in FIG. 3. The validation result notifying 430 enables notification to be provided to, and feedback to be received from, the third party system 404 via the feedback mode, which is not available via the feedforward mode.

Although a level of confidentiality associated with the feedforward mode is higher than for the feedback mode, due to the feedforward mode not sending out analysis results to the third-party system 404, and due to the feedforward mode not receiving responses from the third-party system 404 based on the analysis results, a level of accuracy associated with the feedback mode may be higher than for the feedforward mode. The level of confidentiality is higher in the feedforward mode because communications to and from the third-party system 404 are not sent in the feedforward mode to obtain feedback, thereby avoiding vulnerabilities due to undesirable detection or identification of the communications by bad actors. On the other hand, a level of accuracy is higher in the feedback mode, because communications to and from the third-party system 404 enable operators of the third-party system 404 to fine-tune and/or correct boundary(ies) and/or data in the target boundary report 428. The higher level of accuracy in the feedback mode ensures that alignment between types of content in the encoded media content is optimized.

The validation results notifying 430 can be utilized to identify and/or generate validation notifications 432. By way of example, one or more validations notification 432 can be identified and/or generated, which can be utilized and/or received by the third-party system 404, via a notification component (or "notification") 434. The validation notification(s) 432 can include any information (e.g., the sample encode 416, the target boundary report 428, and/or any boundary(ies) identified by and/or included in the target boundary report 428) utilized by the validation result notifying 430.

The notification 434 can be utilized by a manual review component (or "manual review") 436 of the third-party system 404. By way of example, a device (e.g., one of the third-party devices 122) (or "operator device") can include an operator interface to identify one or more selections (or "operator selection(s)") via operator input received by the operator device. The operator selection(s) can be utilized to substitute, modify, correct, update, reposition, etc., and of the information (e.g., the sample encode 416, the target boundary report 428, and/or any boundary(ies) identified by and/or included in the target boundary report 428 identified via the validation notifications 432.

Results (or "output") of the manual review 436 can be identified and/or provided as one or more manual overrides (e.g., manual overrides) 438. The manual overrides 438 can be identified by, and/or included in, a feedback boundary request 440.

The feedback boundary request 440 can be utilized by an ingestion component (or "ingestion") 442, which can identify and/or provide the manual overrides 438, via a feedback content component (or "feedback content") 444, to the media content management system 402. The feedback content 444 can identify and utilize the feedback boundary request 440 to identify and/or generate a mezzanine file (or "mezzanine") 446. The feedback boundary request 440 can include boundary(ies) associated with the mezzanine 446 (e.g., boundary(ies) referring to media content of the mezzanine 446). The mezzanine 446 can be identified and/or generated in a similar way as for the mezzanine 412. The mezzanine 446 (e.g., data/content included in, and/or a type of, the mezzanine) can be the same as, or different from, the mezzanine 412. By way of example, a resolution associated with the mezzanine 446 can be the same as, or different from, the resolution associated with the mezzanine 412.

The feedback boundary request 440 can include one or more pointers to one or more overrides (e.g., pointers to overrides) 450 associated with the target boundary report 428. The pointers to overrides 450 be point to portions (e.g., corresponding boundaries) of the target boundary report 428. The pointers to overrides 450 can be utilized to indicate boundary(ies) identified and/or generated by the feedback boundary request 440 to be utilized for encoding and/or packaging of the media content, instead of corresponding boundary(ies) in the target boundary report 428 generated by the boundary consolidating 426.

The feedback boundary request 440 can be utilized by a boundaries consolidating component (or "boundaries consolidating") 452. The boundaries consolidating 452 can utilize the feedback boundary request 440, the default boundary report 420, the CV/ML boundary report 424, and the feedback boundary request 440 (e.g., any data, including the pointers to overrides 450 of the feedback boundary request 4400, to consolidate (or "re-consolidate") the boundary(ies) associated with the media content (e.g., the content received as the ingestion content 408). Consolidating the boundary(ies) performed by the boundaries consolidating 452 can be performed in a similar way as for the boundaries consolidating 426, except with a higher level of accuracy. The higher level of accuracy for the boundary(ies) can be achieved as a result of the manual overrides 438.

The boundaries consolidating 452 can identify and/or generate a sample encode 454 and a target boundary report 428, in a similar way as for the sample encode 416 and the target boundary report 428, respectively. A level of accuracy of the sample encode 454 and the target boundary report 428 can be higher than for the sample encode 416 and the target boundary report 428, respectively.

The sample encode 454 and the target boundary report 428 can be utilized by a validation results notifying component (or "validation results notifying") 448 to identify and/or provide validation notifications 454, in a similar way as the validation result notifying 430 and the validation notifications 432, respectively. The validation notifications 454 can be utilized by a manual review 458 in a similar way as for the manual 436. Manual overrides can be identified by a repeat (or "repeat") component 460, in a similar way as for the manual overrides 438. The manual overrides identified by the repeat 460 can be utilized by a notification component (or "notification") 462 to identify feedback content 464, in a similar way as for the notification 452 and the feedback content 444. An iterative process, including any number of feedback requests can be performed any number of times to identify feedback content in a similar way as discussed above for the feedback content 444 and/or the feedback content 464, to provide increasing levels of accuracy for the corresponding target boundary reports.

The target boundary reports can be processed by corresponding components to identify and/or generate a PID payload, and/or to perform content stitching and/or insertion, as discussed above in FIG. 3. The PID payload associated with the feedback mode can have a higher level of accuracy than for the feedback forward mode.

Although the terms "user" and "operator" are used for simplicity and/or clarity throughout the current disclosure, it is not limited as such. In some examples, any of the terms including "user" and "operator" can be utilized interchangeably, and/or interpreted in a similar way, with respect to any of the techniques discussed herein.

Figure 5:
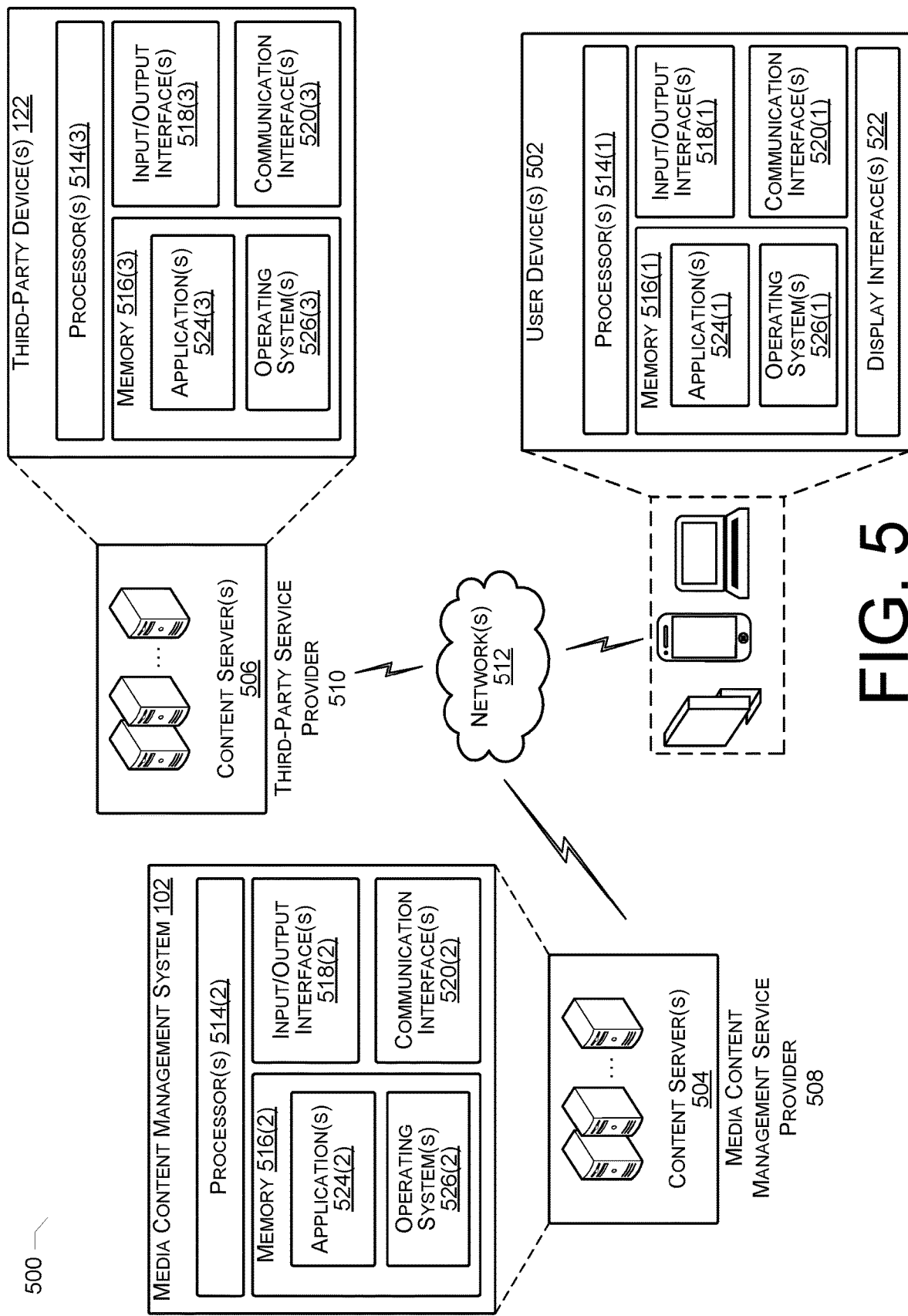
FIG. 5 is an example system that includes multiple devices that coordinate media content encoding, supplemental content stitching, and supplemental content insertion, in accordance with at least one embodiment.

FIG. 5 is an example system 500 that includes multiple devices that coordinate media content encoding, supplemental content stitching, and supplemental content insertion, in accordance with at least one embodiment.

The user device(s) 502 may include one or more of the devices (e.g., local devices, remote devices, etc.), as discussed throughout this disclosure. Individual ones of the user device(s) 502 may utilized to implement any functions of the remote devices, as discussed throughout this disclosure. The content server(s) 504 may be associated with a service provider 508. The content server(s) 504 may be included in, and utilized to implement any functions of, the media content management system 102 shown in FIG. 1. The content server(s) 504 may be associated with a service provider 508. The third-party content server(s) 506 may be associated with a third-party service provider 510. The third-party content server(s) 506 may be included in, and utilized to implement any functions of, a third-party system including third-party device(s) 122 (e.g., a system associated with a third-party service provider).

The user device(s) 502, the content server(s) 504, and the third-party content server(s) 506 may be configured to communicate with one another via one or more networks 512. The user device(s) 502 may communicate with the content server(s) 504 and the third-party content server(s) 506, such as to transmit requests to, and receive responses from, the content server(s) 504 and the third-party content server(s) 506. The user device(s) 502 may transmit any information associated with the requests to, and receive any information associated with the responses from, the content server(s) 504 and the third-party content server(s) 506. The user device(s) 502 may communicate between one another utilizing the network(s) 512. The content server(s) 504 may transmit any information associated with the requests to, and receive any information associated with the responses from, the third-party content server(s) 506. The third-party content server(s) 506 may transmit any information associated with the requests to, and receive any information associated with the responses from, the content server(s) 504.

The network(s) 512 may include the Internet, cable networks, cellular networks, wireless networks (e.g., Wi-Fi) and/or wired networks, as well as close-range communications such as Bluetooth®, Bluetooth® low energy, or the like. The user device(s) 502, the content server(s) 504, and/or the third-party content server(s) 506 may communicate among one another utilizing the same type, or different types, of networks (e.g., networks with different protocols). The network(s) 512 may include the Internet, cable networks, cellular networks, wireless networks (e.g., Wi-Fi) and/or wired networks, as well as close-range communications such as Bluetooth®, Bluetooth® low energy, or the like).

The user device(s) 502 may represent, but are not limited to, televisions (TVs), cellular telephones, desktop computers, server computers or blade servers such as web-servers, map-reduce servers, or other computation engines or network-attached storage units, personal computers, mobile computers, laptop computers, tablet computers, telecommunication devices, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, voice-enabled device(s), or any other sort of computing device coverable of sending communications and performing the functions according to the techniques described herein. Among these TVs are liquid crystal display (LCD) TVs, light emitting diode (LED) TVs, organic light emitting diode (OLED) TVs, plasma display devices (PDP) TVs, quantum dot (QLED) TVs, and electroluminescent (ELD) TVs. In some examples, the voice-enabled device(s) of the user device(s) 502 may include devices with or without display components. In some examples, the display device(s) of the user device(s) 502 may include devices with or without speech processing components.

In the illustrated example, the user device(s) 502, the content server(s) 504, and/or the third-party content server(s) 506 include one or more processors 514(1), 514(2), and/or 514(3) (collectively processor(s) 514), at least one memory 516(1), 516(2), and/or 516(3) (collectively memory 516), one or more input/output (I/O) interfaces 518(1), 518(2), and/or 518(3) (collectively I/O interface(s) 518), and/or one or more communication (e.g., network) interfaces 520(1), 520(2), and/or 520(3) (collectively communication interface(s) 520). The user device(s) 504 may include one or more display interfaces 522. In some examples, one or more of the voice-controlled device(s) among the user device(s) 504 are controlled only by voice and do not include any display interface.

Each processor 514 may include multiple processors and/or a processor having multiple cores. Further, the processor(s) 514 may include one or more cores of different types. For example, the processor(s) 514 may include application processor units, graphic processing units, and so forth. In various examples, the processor(s) 514 may include one or more microprocessors, microcomputers, microcontrollers, digital signal processors, central processing units, state machines, logic circuitries, and/or any devices that manipulate signals based on operational instructions. In some examples, the processor(s) 514 may include one or more hardware processors and/or logic circuits of any suitable type specifically programmed or configured to execute the algorithms and processes described herein.

For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 514 may possess its own local memory, which also may store program components, program data, and/or one or more operating systems.

In some examples, the processor(s) 514 may be configured to fetch and execute computer-readable processor-executable instructions stored in the memory 516. Depending on the configuration of user device(s) 502, the content server(s) 504, and the third-party content server(s) 506, the memory 516 may be an example of tangible non-transitory computer storage media and may include volatile and non-volatile memory and/or removable and non-removable media implemented in any type of technology for storage of information such as computer-readable processor-executable instructions, data structures, program modules or other data. Such memory 516 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. The memory 516 may be implemented as computer-readable storage media ("CRSM"), which may be any available physical media accessible by the processor(s) 514 to execute instructions stored on the memory 516. In some examples, CRSM may include random access memory ("RAM") and Flash memory. In other examples, CRSM may include, but is not limited to, read-only memory ("ROM"), electrically erasable programmable read-only memory ("EEPROM"), or any other tangible medium which may be used to store the desired information, and which may be accessed by the processor(s) 514.

The memory 516 may be used to store and maintain any number of functional components that are executable by the processor 514. In some examples, these functional components include instructions or programs that are executable by the processor 514 and that, when executed, implement operational logic for performing the actions and services attributed above to the user device(s) 502, the content server(s) 504, and the third-party content server(s) 506. Functional components of the user device(s) 502, the content server(s) 504, and the third-party content server(s) 506 stored in the memory 516(1), 516(2), and/or 516(3) may include applications 524(1), 524(2), and/or 524(3) (collectively applications 524). The application(s) 524 may configure the respective devices to perform functions described herein such as with regard to FIGS. 1-3 and 5.

The functional components of the user device(s) 502, the content server(s) 504, and the third-party content server(s) 506 stored in the memory 516(1), 516(2), and/or 516(3) may additionally include operating systems 526(1), 526(2), and/or 526(3), respectively (collectively operating systems 526). The operating system(s) 526 for controlling and managing various functions of the user device(s) 502, the content server(s) 504, and the third-party content server(s) 506. The memory 516 may also store other modules and data, which may include programs, drivers, etc., and the data used or generated by the functional components, to enable efficient and effective food order processing. Further, the user device(s) 502, the content server(s) 504, and the third-party content server(s) 506 may include many other logical, programmatic and physical components, of which those described are merely examples that are related to the discussion herein. In addition, the memory 516 may also store data, data structures and the like, that are used by the functional components.

The I/O interface(s) 518, may include scanners (e.g., for scanning bar codes, QR codes, etc.), speakers, a microphone, a camera, and various user controls (e.g., buttons, a joystick, a keyboard, a keypad, etc.), a haptic output device, and so forth. The communication interface(s) 520 may include one or more interfaces and hardware components for enabling communication with various other devices over the network or directly.

Figure 6:
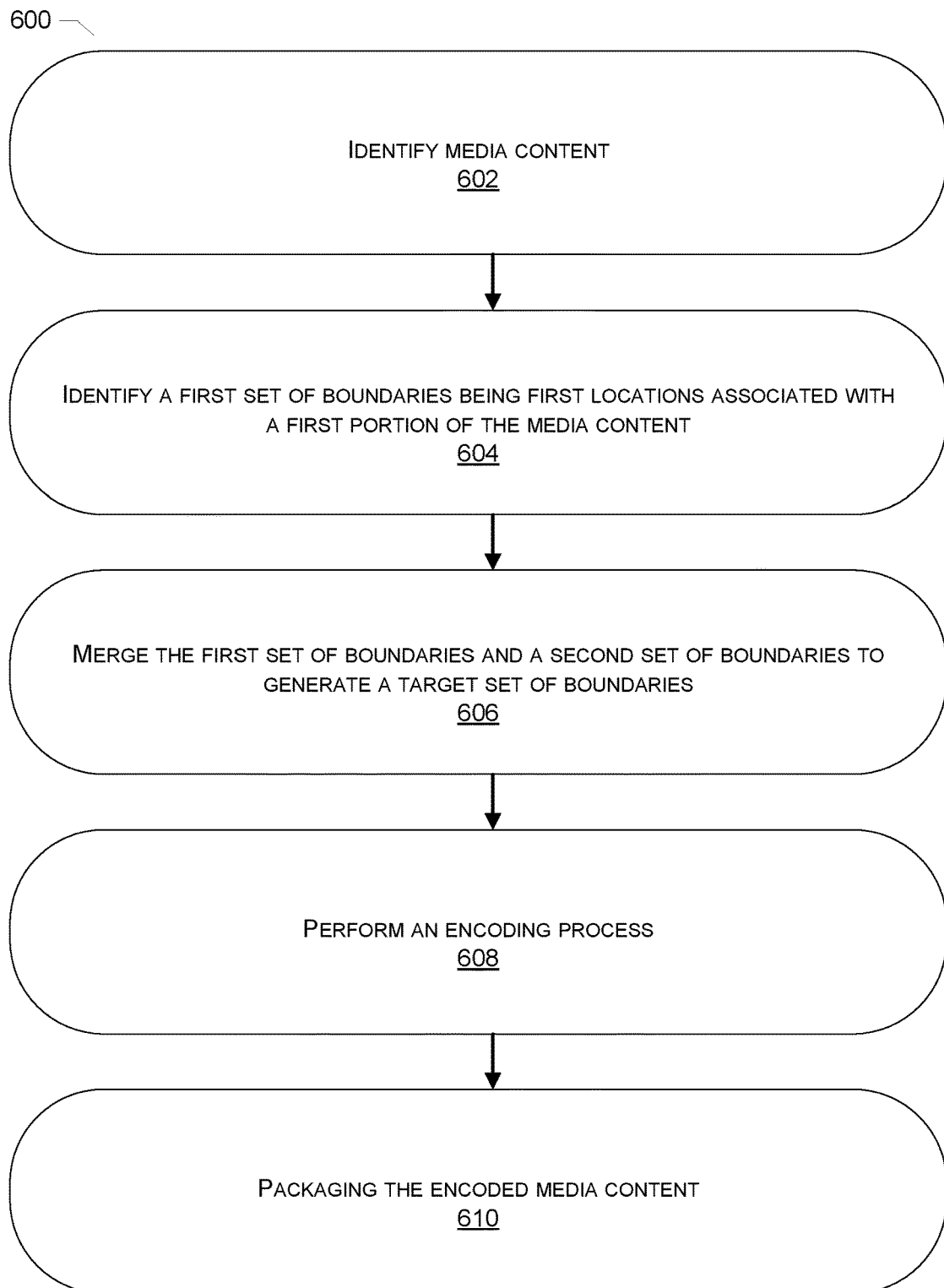
FIG. 6 is a flow diagram of an illustrative process to perform media content encoding, supplemental content stitching, and supplemental content insertion.

FIG. 6 is a flow diagram of an illustrative process 600 to perform media content encoding.

At 602, the process 600 can include identifying media content. The media content can be generated by the media content management system 102 or the third-party device(s) 122. The media content can include audio content, video content, and/or other one or more other types of content (e.g., thumbnails content, subtitles content, etc.).

At 604, the process 600 can include identifying a first set of boundaries being first locations associated with a first portion of media content. The first set of boundaries can be identified via the boundary management component. The first set of boundaries can be received from the third-party device(s) 122.

At 606, the process 600 can include merging the first set of boundaries and a second set of boundaries to generate a target set of boundaries. The second set of boundaries can be computer vision/machine learning (CV/ML) boundaries. The target set of boundaries can be selected from the CV/ML boundaries and the default boundaries.

At 608, the process 600 can include performing an encoding process. The encoding process can be utilized to encode the media content utilizing the video content, the audio content, and the target third set of boundaries.

At 610, the process 600 can include packaging the encoded media. The media content can be packaged by fragmenting and segmenting the video content, and by fragmenting and segmenting the audio content, and aligning audio segments with video segments. The audio segments being aligned with the video segments can ensure that output of the audio content will be synchronized with output of the video content during playback.

Figure 7:
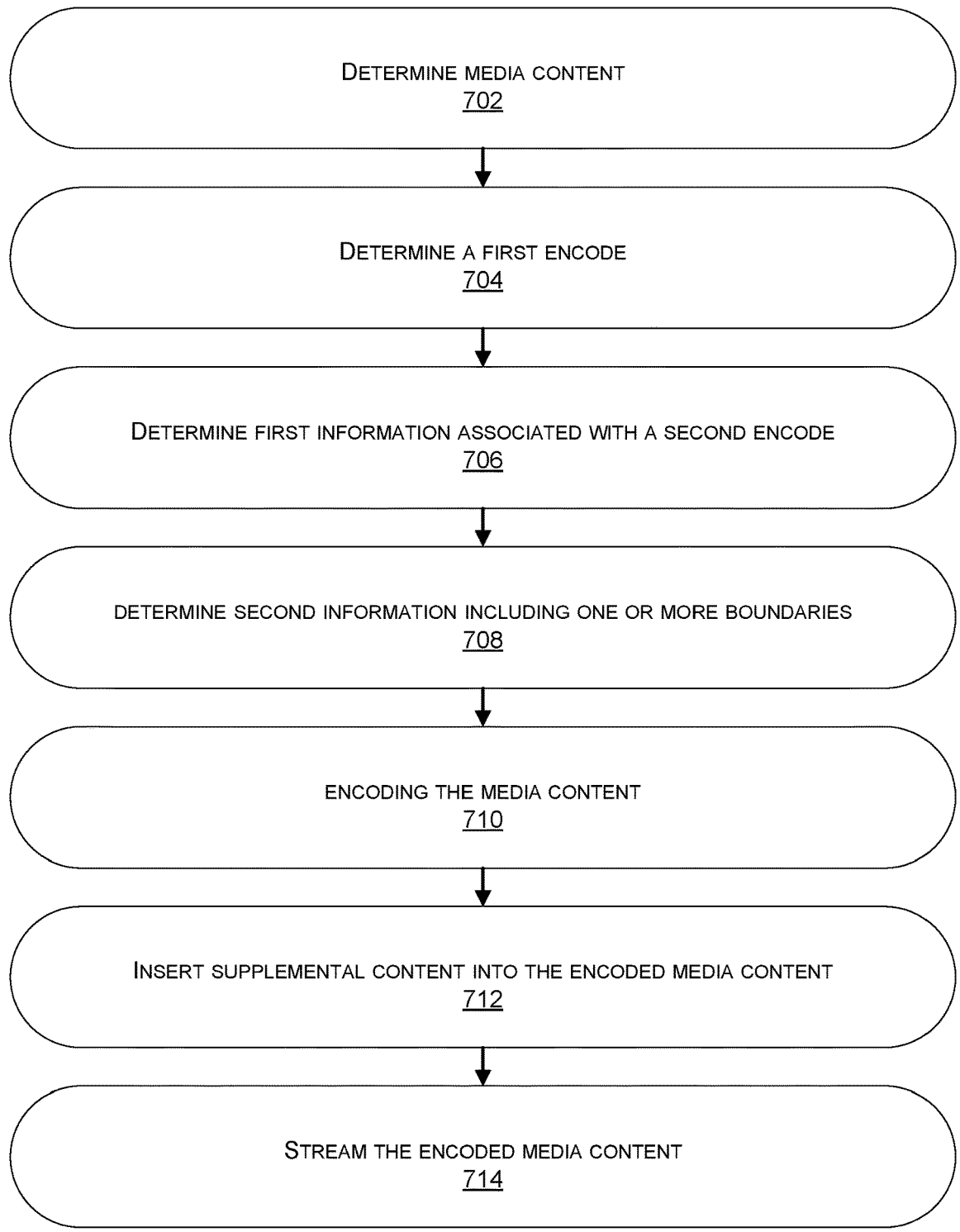
FIG. 7 is a flow diagram of an illustrative process to perform supplemental content stitching and/or supplemental content insertion.

FIG. 7 is a flow diagram of an illustrative process 700 to perform supplemental content stitching and/or supplemental content insertion.

At 702, the process 700 can include determining media content. The media content, which can be received by a media content management system 102 and from a third-party device 122, can include audio content and video content.

At 704, the process 700 can include determining a first encode. The first encode can include encoded media content in a mezzanine. The first encode can have full-resolution.

At 706, the process 700 can include determining first information associated with a second encode. The second encode can include encoded media content with a 480p resolution.

At 708, the process 700 can include determining second information including one or more boundaries. The boundaries can include computer vision/machine learning (CV/ML) boundaries and/or default boundaries generated based on the second encode.

At 710, the process 700 can include encoding the media content.

At 712, the process 700 can include inserting, as inserted supplemental content, supplemental content into the encoded media content. The supplemental content can be stitched with the encoded media content.

At 714, the process 700 can include streaming, to a user device, the encoded media content. The encoded media content can be streamed, with synchronized audio and video content.

Although the term "user" is utilized throughout this disclosure, it is not limited as such and the term "user" is utilized for simplicity. The term "user" as used throughout disclosure may denote any type of user, including a user, an administrator, etc.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system comprising:
    at least one processor; and
    at least one non-transitory computer-readable storage medium having computer-executable instructions stored thereon which, when executed on the at least one processor, cause the system to perform operations comprising:
        receiving, from a third-party device associated with a third-party, a request;
        identifying, via the request, a first set of boundaries associated with first locations of first frames in media content;
        identifying a second set of boundaries and a third set of boundaries associated with the media content, the second set of boundaries being associated with second locations of second frames in the media content and being generated utilizing a computer vision/machine learning (CV/ML) device, the third set of boundaries being associated with third locations of third frames in the media content, the third locations being default locations generated utilizing an encoder algorithm for placing instantaneous decoder refresh (IDR) frames;
        merging a combination of boundaries, including the first set of boundaries, the second set of boundaries, and the third set of boundaries, to generate a target set of boundaries, the target set of boundaries being associated with target locations of target frames in the media content;
        performing, based on a target boundary report, a CV/ML boundary report, and a default boundary report, an encoding process with the target set of boundaries to encode video content and audio content of the media content as encoded media content, the target boundary report including the target set of boundaries and having a higher level of accuracy than at least one of the CV/ML boundary report or the default boundary report, the CV/ML boundary report including the second set of boundaries, the default boundary report including the third set of boundaries; and
        packaging the encoded media content as packaged media content, with segments of the audio content being aligned with the target set of boundaries, such that the video content and the audio content are synchronized during playback of the encoded media content.

2. The system of claim 1, wherein merging the first set of boundaries and the second set of boundaries further comprises:
    performing a first boundary generation process utilized to generate the CV/ML boundary report, the CV/ML boundary report including a CV/ML boundary report log generated based on the media content, the CV/ML boundary report log including information associated with automated generation of boundaries by the CV/ML device, the automated generation being utilized by the CV/ML device to infer CV/ML generated boundaries utilizing a 480p encode of the media content, the media content being analyzed by the 480p encode for IDR frame placement, the IDR frame placement being utilized to identify IDR frames and non-IDR frames in the media content, individual ones of the IDR frames being followed by at least one of the non-IDR frames;
    performing a second boundary generation process utilized to generate the default boundary report, the default boundary report including a default boundary report log associated with the 480p encode of the media content; and
    performing a third boundary generation process on the media content utilized to generate the target boundary report, the target boundary report being a combination of the CV/ML boundary report and the default boundary report, the target boundary report being identified as having a higher level of accuracy than at least one of the CV/ML boundary report or the default boundary report log,
    wherein performing the encoding process further comprises encoding the media content based on the target boundary report, the default boundary report, and the CV/ML boundary report.

3. The system of claim 1, the first set of boundaries including at least one first cue-point, the operations further comprising:
    receiving, from the third-party device, at least one second cue-point via a selection of a manifest link associated with the encoded video content,
    wherein:
    individual ones of at least one first level of precision are associated with first alignment between at least one corresponding first cue-point and at least one corresponding first segment of the media content;
    individual ones of at least one second level of precision are associated with second alignment between at least one corresponding second cue-point and at least one corresponding second segment of the encoded media content; and the individual ones of the at least one second level of precision are equal to or greater than the individual ones of the at least one first level of precision.

4. The system of claim 1, the operations further comprising:
generating a manifest link to obtain a manifest associated with the packaged media content;
transmitting the manifest link to a destination device;
receiving, from the destination device, a client request indicating a selection of the manifest link via user input received by the destination device;
determining that the client request is to stream the packaged media content; and
enabling streaming of the packaged media content via the destination device.

5. The system of claim 1, wherein performing the encoding process further comprises:
encoding subtitles content as encoded subtitles content; and
encoding thumbnails content as encoded thumbnails content, the encoded subtitles content and the encoded thumbnails content being temporally aligned with the encoded media content.

6. A system comprising:
at least one processor; and
at least one non-transitory computer-readable storage medium having computer-executable instructions stored thereon which, when executed by the at least one processor, cause the system to perform operations comprising:
identifying media content, the media content including video content and audio content;
identifying a first set of boundaries, the first set of boundaries being first locations associated with a first portion of the media content associated with a media content identifier, the first set of boundaries being associated with at least one of a computer vision/machine learning (CV/ML) device or an instantaneous decoder refresh (IDR) frames placing encoder algorithm;
merging the first set of boundaries and a second set of boundaries to generate a target set of boundaries, the second set of boundaries being second locations associated with a second portion of the media content;
performing, based at least in part on a target boundary report, and at least one of a CV/ML boundary report or a default boundary report, an encoding process to encode the media content as encoded media content, the encoding process utilizing the video content, the audio content, and the target set of boundaries, the target boundary report including the target set of boundaries, and at least one of the CV/ML boundary report including the first set of boundaries or the default boundary report including the second set of boundaries; and
packaging the encoded media content as packaged media content.

7. The system of claim 6, the operations further comprising:
receiving a boundary request from a third-party device; and
identifying, via the boundary request, a boundary request file and the media content identifier, the boundary request file including an encode value indicating a third-party request for tailorable encode utilized to generate the encoded media content, the boundary request file including automated media content insertion location information instructions, the automated media content insertion location information instructions being utilizable to automate processing of the third-party request by a CV/ML device over a 480p encode of the media content with a vertical resolution of 480 pixels.

8. The system of claim 6, wherein merging the first set of boundaries and the second set of boundaries further comprises:
performing a first boundary generation process utilized to generate the CV/ML boundary report including the second set of boundaries, the CV/ML boundary report including a CV/ML boundary report log generated based at least in part on the media content, the CV/ML boundary report log including information associated with automated generation of boundaries by the CV/ML device, the automated generation being utilized by the CV/ML device to infer CV/ML generated boundaries utilizing a 480p encode of the media content with a vertical resolution of 480 pixels, the media content being analyzed by the 480p encode for instantaneous decoder refresh (IDR) frame placement, the IDR frame placement being utilized to identify IDR frames and non-IDR frames associated with a third portion of the media content, individual ones of the IDR frames being followed by at least one of the non-IDR frames;
performing a second boundary generation process utilized to generate the default boundary report, the default boundary report including a default boundary report log associated with the 480p encode of the media content; and
performing a third boundary generation process on the media content utilized to generate the target boundary report, the target boundary report being a combination of the CV/ML boundary report and the default boundary report, the target boundary report being identified as having a higher level of accuracy than at least one of the CV/ML boundary report or the default report log,
wherein performing the encoding process further comprises encoding the media content based at least in part on the target boundary report, the default boundary report, and the CV/ML boundary report.

9. The system of claim 6, the operations further comprising:
generating a manifest link associated with the packaged media content;
transmitting the manifest link to a destination device;
receiving, from the destination device, a client request indicating a selection of the manifest link via user input received by the destination device;
determining that the client request is to stream the packaged media content; and
enabling streaming of the packaged media content via the destination device.

10. The system of claim 6,
wherein performing the encoding process further comprises:
encoding subtitles content as encoded subtitles content; and encoding thumbnails content as encoded thumbnails content, the encoded subtitles content and the encoded thumbnails content being temporally aligned with the encoded media content.

11. The system of claim 6, the operations further comprising:
generating the CV/ML boundary report and the default boundary report, the CV/ML boundary report and the default boundary report being generated utilizing the video content;
generating the target boundary report as a first target boundary report, the first target boundary report being generated utilizing the CV/ML boundary report and the default boundary report;
transmitting the first target boundary report to a client device;
receiving feedback information from the client device; and
generating a second target boundary report based at least in part on the feedback information.

12. The system of claim 6, the operations further comprising:
receiving, from a client device, a feedback mechanism identifier;
generating the target boundary report; and
transmitting the target boundary report to the client device based at least in part on the feedback mechanism identifier,
wherein encoding the video content further comprises encoding the video content based at least in part on feedback information received from the client device.

13. The system of claim 6, the operations further comprising:
receiving, from a client device, a feedforward mechanism identifier;
generating the target boundary report; and
refraining from transmitting the target boundary report to the client device based at least in part on the feedforward mechanism identifier,
wherein encoding the video content further comprises encoding the video content based at least in part on the target boundary report.

14. A method comprising:
identifying video content and audio content associated with the video content;
identifying a boundary request received from a third-party device;
identifying a computer vision/machine learning (CV/ML) set of boundaries and a default set of boundaries associated with the video content, the CV/ML set of boundaries being first locations associated with a first portion of the video content, the default set of boundaries being second locations associated with a second portion of the video content, the default set of boundaries being associated with a predetermined resolution of the video content;
generating a target set of boundaries by merging a combination of boundaries, including the CV/ML set of boundaries and the default set of boundaries, the target set of boundaries being associated with target locations of target frames in the video content and including selected boundaries from the combination of boundaries having higher accuracy levels than remaining unselected boundaries in the combination of boundaries;
performing, based at least in part on a target boundary report, and at least one of a CV/ML boundary report or a default boundary report, an encoding process utilizing the target set of boundaries to encode the video content and the audio content as encoded media content, the target boundary report including the target set of boundaries, and at least one of the CV/ML boundary report including the CV/ML set of boundaries or the default boundary report including the default set of boundaries; and
packaging the encoded media content as packaged media content.

15. The method of claim 14, further comprising:
identifying a third-party set of boundaries received from a third-party-device,
wherein generating the target set of boundaries further comprises:
generating the target set of boundaries from a second combination of the third-party set of boundaries, the CV/ML set of boundaries, and the default set of boundaries, the target set of boundaries being a second consolidation of the selected boundaries from among the combination, based on the selected boundaries being identified as having higher accuracy levels than remaining unselected boundaries in the combination.

16. The method of claim 14, further comprising at least one of:
performing a first boundary generation process utilized to generate the CV/ML boundary report;
performing a second boundary generation process utilized to generate the default boundary report; and
performing a third boundary generation process utilized to generate the target boundary report,
wherein the encoding process is based at least in part on the CV/ML boundary report, the default boundary report, and the target boundary report.

17. The method of claim 14, further comprising:
generating a manifest link associated with the packaged media content;
transmitting the manifest link to a destination device;
receiving, from the destination device, a client request indicating a selection of the manifest link via user input received by the destination device;
determining the client request is to stream the packaged media content; and
enabling streaming of the packaged media content via the destination device.

18. The method of claim 14,
wherein performing the encoding process further comprises:
encoding subtitles content as encoded subtitles content; and
encoding thumbnails content as encoded thumbnails content, the encoded subtitles content and the encoded thumbnails content being temporally aligned with the encoded video content.

19. The method of claim 14, further comprising:
generating the CV/ML boundary report and the default boundary report, the CV/ML boundary report and the default boundary report being generated utilizing the video content;
generating the target boundary report as a first target boundary report, the first target boundary report being generated utilizing the CV/ML boundary report and the default boundary report;
transmitting the first target boundary report to a client device;
receiving feedback information from the client device; and generating a second target boundary report based at least in part on the feedback information.

20. The method of claim 14, further comprising:

receiving, from a client device, a feedback mechanism identifier;

generating the target boundary report; and transmitting the target boundary report to the client device based at least in part on the feedback mechanism identifier, wherein encoding the video content further comprises encoding the video content based at least in part on feedback information received from the client device.

* * * * *